(12) United States Patent
Hefner et al.

(10) Patent No.: US 11,064,067 B2
(45) Date of Patent: Jul. 13, 2021

(54) GESTURE DETECTION BASED ON DEVICE FORM FACTOR

(71) Applicant: Motorola Mobility LLC, Chicago, IL (US)

(72) Inventors: Eric Jay Hefner, Lombard, IL (US); John Samuel Ratke, Chicago, IL (US); Jenna Marie Zylema, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/588,664

(22) Filed: Sep. 30, 2019

(65) Prior Publication Data
US 2021/0099569 A1   Apr. 1, 2021

(51) Int. Cl.
*H04M 1/00* (2006.01)
*H04M 1/72448* (2021.01)
*H04M 1/02* (2006.01)

(52) U.S. Cl.
CPC ..... *H04M 1/72448* (2021.01); *H04M 1/0216* (2013.01)

(58) Field of Classification Search
CPC .................. H04M 1/72563; H04M 1/0216
USPC ..................................................... 455/575.3
See application file for complete search history.

(56) References Cited

U.S. PATENT DOCUMENTS

| | | | | |
|---|---|---|---|---|
| 5,918,188 A | * | 6/1999 | Doran | H04M 1/0245 455/575.3 |
| 6,342,738 B1 | * | 1/2002 | Lutnaes | H04M 1/0214 307/125 |
| 6,628,974 B1 | * | 9/2003 | Lim | H04M 1/0216 379/433.11 |
| 7,010,333 B2 | * | 3/2006 | Trively | H04M 1/23 455/575.3 |
| 7,196,316 B2 | * | 3/2007 | Chan | H04M 1/605 250/221 |
| 7,395,089 B1 | * | 7/2008 | Hawkins | H04W 52/027 455/556.1 |
| 8,014,845 B2 | * | 9/2011 | Murakoso | H04M 1/0247 455/575.4 |
| 8,036,699 B2 | * | 10/2011 | Araki | H04M 19/04 455/550.1 |
| 8,165,647 B2 | * | 4/2012 | Cho | G06F 1/1624 455/575.3 |

(Continued)

*Primary Examiner* — April G Gonzales
(74) *Attorney, Agent, or Firm* — FIG. 1 Patents

(57) ABSTRACT

In aspects of gesture detection based on device form factor, a device includes gesture detection algorithms from which gestures are detectable based on device configurations. The device implements a gesture module to determine a form factor of the device as one of the device configurations, and select a gesture detection algorithm that corresponds to the form factor. The gesture module then utilizes the selected gesture detection algorithm to detect a gesture performed by a user holding the device in the device form factor. Additionally, the gesture module can determine a change in the device form factor. The gesture module can then replace the gesture detection algorithm with a different gesture detection algorithm, or replace parameter values in the gesture detection algorithm with respective updated parameter values, which are then usable to detect another instance of the gesture performed by the user holding the device in the changed form factor.

20 Claims, 10 Drawing Sheets

(56) References Cited

U.S. PATENT DOCUMENTS

| | | | | |
|---|---|---|---|---|
| 8,195,243 B2* | 6/2012 | Kim | ............... | H04M 1/0247 |
| | | | | 455/566 |
| 8,264,823 B2* | 9/2012 | Kim | ............... | H04M 1/0216 |
| | | | | 361/679.01 |
| 8,411,427 B2* | 4/2013 | Jeong | ............ | H04M 1/0247 |
| | | | | 361/679.27 |
| 8,750,939 B2* | 6/2014 | Song | ............. | H04W 4/12 |
| | | | | 455/566 |
| 9,013,867 B2* | 4/2015 | Becze | ............ | H04M 1/0216 |
| | | | | 361/679.27 |
| 2003/0144036 A1* | 7/2003 | Ito | ................. | H04M 1/0245 |
| | | | | 455/566 |
| 2010/0151846 A1* | 6/2010 | Vuong | ............ | H04M 1/0245 |
| | | | | 455/418 |
| 2011/0136552 A1* | 6/2011 | Lee | ................. | H04M 1/04 |
| | | | | 455/575.3 |
| 2015/0022439 A1* | 1/2015 | Alameh | ............ | G06F 3/017 |
| | | | | 345/156 |
| 2019/0146629 A1* | 5/2019 | Moon | ............. | H05K 7/00 |
| | | | | 345/174 |

* cited by examiner

GESTURE DETECTION BASED ON DEVICE FORM FACTOR

BACKGROUND

Devices such as smart devices, mobile devices (e.g., cellular phones, tablet devices), consumer electronics, and the like can be implemented for use in a wide range of industries and for a variety of different applications. Many of these devices can have multiple device configurations, some of which may be mechanical in nature, and users may perform gestures while holding these devices in one or more of the device configurations. For example, a flip phone is a mobile device that has flip-open and flip-closed configurations, while other types of devices may have different device configurations that include an additional component either attached to the device, or removed from the device. In some devices, a gesture is detected by sensors of a device and the type of gesture can be determined by an algorithm that is implemented by the device. However, physical changes in a device configuration can affect the performance of the gesture detection, and a similar gesture input effort by a user may not be detected the same for different device configurations. This inconsistent performance can be frustrating for a user trying to initiate a device application on a mobile device with a gesture, resulting in a poor user experience.

BRIEF DESCRIPTION OF THE DRAWINGS

Implementations of the techniques of gesture detection based on form factor are described with reference to the following Figures. The same numbers may be used throughout to reference like features and components shown in the Figures.

DETAILED DESCRIPTION

Figure 1:
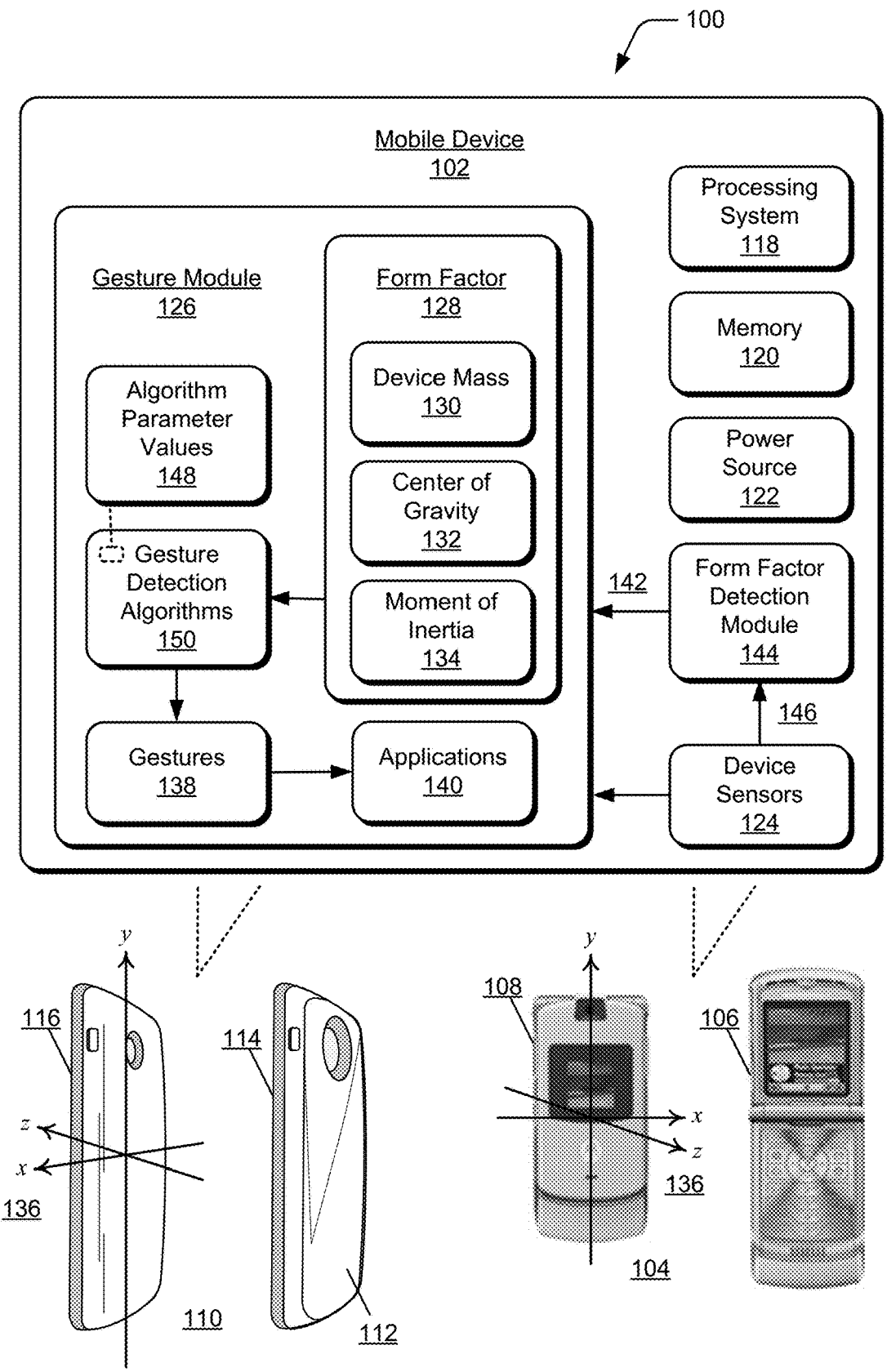
FIG. 1 illustrates an example device that can be used to implement techniques of gesture detection based on device form factor as described herein.

Implementations of gesture detection based on device form factor are described, and provide techniques to detect gestures based on device configurations that include different device form factors. In implementations, a mobile device, such as a flip phone, has a flip-open configuration and a flip-closed configuration, which are different form factors of the device. Notably, a change in the form factor of the flip phone, such as from the flip-open configuration to the flip-closed configuration (or vice-versa), will alter the device's center of gravity, which can adversely affect gesture detection by the device. Similarly, a mobile device, such as a mobile phone or tablet device, may have different device configurations that include an additional component either attached to the device, or removed from the device, which changes the device form factor. Notably, a change in the form factor of the mobile device, such as by attaching or integrating an additional component, can alter the device's mass, center of gravity, and/or a moment of inertia of the device, which can also adversely affect gesture detection by the device.

For example, an additional component integrated or attached to a mobile device, such as a mobile phone or tablet device, may include a larger battery pack, a heavy-duty protective cover, or a modular component, either as an integrated component of the mobile device or as an attachment that operates with the mobile device. In implementations, a modular component can add an additional communication technology (e.g., cellular 5 G) to the mobile device, provide a higher resolution camera device, or provide additional performance, entertainment, gaming, and/or audio and visual enhancements as integrated modular components of the mobile device. As noted above, physical changes in a device configuration can affect the gesture input effort needed by a user to perform a gesture while holding the mobile device, such as to initiate a device application based on the detected gesture, and the inconsistent performance can be frustrating for a user trying to initiate the device application with a gesture. In implementations, a gesture module implemented by a mobile device can detect the gesture and initiate to start, stop, open, close, etc. an application on the mobile device.

In aspects of gesture detection based on device form factor as described herein, a mobile device implements a gesture module that can determine a form factor of the mobile device, such as based on an input of a form factor state of the device. For example, the gesture module can determine the form factor of the mobile device that implements the gesture module, such as a flip phone in a flip-open or flip-closed configuration, or a mobile phone that has an additional component attached to the device or removed from the device. A mobile device can be implemented with device sensors, such as integrated in an inertial measurement unit that includes an accelerometer to detect acceleration of the device and includes a gyroscope to detect rotational motion (e.g., an orientation and/or angular velocity) of the device. The inertial measurement unit detects acceleration and rotation, and generates sensor data reported as physical motion events in the form of sensor inputs from which the gesture module can then detect a gesture performed by a user holding the mobile device in a particular form factor using a gesture detection algorithm that corresponds to the particular form factor of the mobile device.

For example, the user holding the mobile device may perform any number of different types of gestures, such as swiveling, twisting, lifting, flipping, chopping, or a rotating motion, to name a few. In implementations, each of the different types of gestures are associated with a respective gesture detection algorithm, and the gesture detection algorithms are correlated with the various different form factors of the mobile device. Notably, the gesture module that is implemented by the mobile device can determine a form factor of the mobile device as one of the device configurations, and then select a gesture detection algorithm from the gesture detection algorithms that corresponds to the determined form factor of the device. The gesture module can then utilize the selected gesture detection algorithm to detect a gesture performed by a user holding the mobile device in the form factor of the device.

For example, the gesture module can detect a gesture performed by a user holding a flip phone in the flip-open configuration utilizing the gesture detection algorithm that corresponds to the flip-open configuration of the device. Similarly, the gesture module can detect a gesture performed by a user holding a flip phone in the flip-closed configuration utilizing a different gesture detection algorithm that corresponds to the flip-closed configuration of the device. In another example, the gesture module can detect a gesture performed by a user holding a mobile phone that has an attachment in a first configuration of the device utilizing the gesture detection algorithm that corresponds to the first configuration of the device. Similarly, the gesture module can detect a gesture performed by the user holding the mobile phone without the attachment in a second configuration of the device utilizing a different gesture detection algorithm that corresponds to the second configuration of the device.

In aspects of the described gesture detection based on device form factor, the gesture module can also determine a change in the form factor of the mobile device, identify a different gesture detection algorithm that corresponds to the change in the form factor of the mobile device, and replace the previous gesture detection algorithm with the different gesture detection algorithm that corresponds to the current form factor of the device. The gesture module can then utilize the different gesture detection algorithm that corresponds to the changed form factor of the device to detect an instance, or another instance, of the gesture performed by the user holding the mobile device in the changed form factor.

Alternatively, the gesture module may determine a change in the form factor of the mobile device, replace one or more parameter values in a gesture detection algorithm with respective updated parameter values, and use the respective updated parameter values in the gesture detection algorithm to detect another instance of the gesture (e.g., a repeated instance of the gesture) performed by the user holding the device in the changed form factor. The respective updated parameter values in the gesture detection algorithm would correspond to the changed form factor of the mobile device, and the parameter values can include, but are not limited to, an acceleration value of the mobile device, a rotational motion value of the mobile device, one or more threshold values, timeout durations, multiplicative factors, offsets, and/or any other type of gesture detection algorithm parameter values.

While features and concepts of gesture detection based on device form factor can be implemented in any number of different devices, systems, environments, and/or configurations, implementations of gesture detection based on device form factor are described in the context of the following example devices, systems, and methods.

FIG. 1 illustrates an example 100 of a mobile device 102 that can be used to implement techniques of gesture detection based on device form factor, as described herein. In this example 100, the mobile device 102 may be a flip phone 104 that has different device configurations, such as a flip-open configuration 106 and a flip-closed configuration 108. Notably, a change in the form factor of the flip phone 104, such as from the flip-open configuration 106 to the flip-closed configuration 108 (or vice-versa), will alter the device's center of gravity, or cause a user of the device to alter his or her grip on the device, either of which can adversely affect gesture detection by the device. For example, when the flip phone 104 is in the open configuration, the hinge may deflect when the device is moved and make certain gestures more difficult for the user to perform.

Alternatively, the mobile device 102 may be a mobile phone 110 that has different device configurations, such as having an additional component 112 attached or integrated in an attached component configuration 114 of the device, or in a standard configuration 116 of the device. As noted above, the additional component 112 may include a larger battery pack, a heavy-duty protective cover, or a modular component, either as an integrated component of the mobile phone 110 or as an attachment that operates with the device. In implementations, a modular component can add an additional communication technology (e.g., cellular 5 G) to the mobile phone 110, provide a higher resolution camera device, or provide additional performance, entertainment, gaming, and/or audio and visual enhancements as integrated modular components of the mobile device.

Generally, the mobile device 102 may be any type of an electronic and/or computing device implemented with various components, such as a processing system 118 and memory 120, as well as any number and combination of different components as further described with reference to the example device shown in FIG. 11. For example, the mobile device 102 can include a power source 122 to power the device, such as a rechargeable battery and/or any other type of active or passive power source that may be implemented in an electronic and/or computing device. Additionally, the mobile device 102 includes device sensors 124, such as an inertial measurement unit (IMU) to detect movements and rotation of the device. For example, an inertial measurement unit implements an accelerometer to detect acceleration of the mobile device 102 based on movement or vibration of the device, and implements a gyroscope to detect rotational motion (e.g., an orientation and/or angular velocity) of the mobile device. In implementations, the device sensors 124 may include dual IMU sensors and an option for selectability between the dual IMU sensors. The device sensors 124 may also include proximity and light sensors, and an option for selectability between the sensors based on the flip configuration of the device (e.g., when implemented as the flip phone 104).

The mobile device 102 includes a gesture module 126 that implements features of gesture detection based on device form factor, as described herein. The gesture module 126 may be implemented as a module that includes independent processing, memory, and logic components functioning as a computing and/or electronic device integrated with the mobile device 102. Alternatively or in addition, the gesture module 126 can be implemented as a software application, software module, or algorithm, such as computer-executable software instructions that are executable with a processor (e.g., with the processing system 118) of the mobile device 102. As a software application, the gesture module 126 can be stored on computer-readable storage memory (e.g., the memory 120 of the device), or any other suitable memory device or electronic data storage implemented with the gesture module. Alternatively or in addition, the gesture module 126 may be implemented in firmware and/or at least partially in computer hardware. For example, at least part of the gesture module may be executable by a computer processor, and/or at least part of the invention module may be implemented in a hardware circuit.

In aspects of gesture detection based on device form factor, the gesture module 126 is implemented to determine the current form factor 128 of the mobile device 102, such as the flip phone 104 in the flip-open configuration 106 or in the flip-closed configuration 108, or the mobile phone 110 in the component configuration 114 with the additional component 112 integrated or attached to the mobile phone, or in the standard configuration 116 of the mobile phone. The physical changes in device configuration, as related to the current form factor 128, can change the device mass 130, the center of gravity 132, and/or a moment of inertia 134 of the mobile device 102, particularly in reference to the position or location of the device sensors 124 (e.g., an IMU) in the device and in relation to a coordinate system 136 (x-axis, y-axis, and z-axis) of the device. In this example, the coordinate system 136 of a mobile device, such as shown in different perspectives with reference to both the flip phone 104 and the mobile phone 110, is defined relative to the center of a device, which may coincide with the center of the device screen, in a default orientation of the device.

Notably, devices that can change form factor are also likely to change the center of gravity, the mass, and/or a moment of inertia of a device, such as a mobile phone with a flip mechanism and/or a mobile device that supports modular component(s). These changes to the center of gravity, the mass, and/or a moment of inertia of a device can adversely impact gesture detection as the sensor inputs of gestures with reference to the coordinate system 136 (the x-axis, y-axis, and z-axis) of the device are detected by the various device sensors 124, such as by sensors of an inertial measurement unit in the device. For example, a camera launch gesture may be triggered by a rapid twist of the device about the y-axis, and a flashlight of the device may be triggered by a double chop of the device along the x-axis with rotation about the z-axis. The physical changes in a device configuration can affect the gesture input effort needed by a user to perform a gesture 138 while holding the mobile device, such as to initiate one or more of the device applications 140 based on the detected gesture.

Accordingly, the gesture module 126 is implemented to determine the form factor 128 of the mobile device 102 as one of the device configurations, such as based on a form factor state input 142 received from a form factor detection module 144 that is implemented to detect the form factor 128 of the mobile device 102 from device sensor inputs 146. The gesture module 126 can then change algorithm parameter values 148 and/or device operation, such that the gestures 138 to initiate the device applications 140 maintain a similar, consistent feel in the hand of the user. The algorithm parameter values 148 can include, but are not limited to, an acceleration value of the mobile device, a rotational motion value of the mobile device, one or more threshold values, timeout durations, multiplicative factors, offsets, and/or any other type of gesture detection algorithm parameter values.

In aspects of the techniques described herein, the gesture module 126 is implemented to select a gesture detection algorithm 150 that corresponds to the current form factor 128 of the mobile device 102. The gesture detection algorithm 150 can be selected from a library of gesture detection algorithms, such as maintained in memory 120 of mobile device 102 and from which the gestures 138 are detectable by the gesture module 126 utilizing the gesture detection algorithms. These different gesture detection algorithms 150 are correlated to the respective different form factors 128 of the mobile device 102, and take into account the variations in device mass 130, center of gravity 132, and/or a moment of inertia 134 of the device as the form factor 128 changes with the different device configurations.

In an example of the mobile device 102 implemented as the flip phone 104, the gesture module 126 selects a gesture detection algorithm 150 that corresponds with either the flip-open configuration 106 or the flip-closed configuration 108, given that either configuration could be the current form factor 128 of the flip phone 104. Notably, the gesture detection algorithm 150 that is selected as corresponding to the flip-open configuration 106 of the flip phone 104 varies from the gesture detection algorithm 150 that is selected as corresponding to the flip-closed configuration 108 of the flip phone, primarily taking into account the differences in device mass 130, center of gravity 132, and/or a moment of inertia 134 associated with the different device configurations.

In another example of the mobile device 102 implemented as the mobile phone 110, gesture module 126 selects a gesture detection algorithm 150 that corresponds with either the standard configuration 116 or the component configuration 114 of the device, given that either configuration could be the current form factor 128 of the mobile phone 110. Notably, the gesture detection algorithm 150 that is selected as corresponding to the component configuration 114 of the mobile phone 110 varies from the gesture detection algorithm 150 that is selected as corresponding to the standard configuration 116 of the mobile phone, primarily taking into account the differences in device mass 130, center of gravity 132, and/or a moment of inertia 134 associated with the different device configurations.

The gesture module 126 is implemented to utilize the selected gesture detection algorithm 150 that corresponds to the current form factor 128 of the mobile device 102 to detect a gesture 138 performed by a user holding the mobile device in the current form factor of the device. For example, the gesture module 126 can detect a gesture 138 performed by a user holding the flip phone 104 in the flip-open configuration 106 (i.e., a form factor 128) utilizing the gesture detection algorithm 150 that corresponds to the flip-open configuration of the device. Similarly, the gesture module 126 can detect a gesture 138 performed by the user holding the flip phone 104 in the flip-closed configuration 108 (i.e., a form factor 128) utilizing a different gesture detection algorithm 150 that corresponds to the flip-closed configuration of the device.

In another example, the gesture module 126 can detect a gesture 138 performed by a user holding the mobile phone 110 that has the additional component 112 attached to the device in the component configuration 114 of the device utilizing the gesture detection algorithm 150 that corresponds to the component configuration 114 of the device. Similarly, the gesture module 126 can detect a gesture 138 performed by the user holding the mobile phone 110 without the additional component 112 attached to the device in the standard configuration 116 of the device utilizing a different gesture detection algorithm 150 that corresponds to the standard configuration of the device.

In other aspects of the described gesture detection based on device form factor, the gesture module 126 can also determine a change in the form factor 128 of the mobile device 102, identify a different gesture detection algorithm 150 that corresponds to the change in the form factor 128 of the mobile device, and replace the previous gesture detection algorithm 150 with the different gesture detection algorithm that corresponds to the current form factor of the device. In implementations, replacing the gesture detection algorithm 150 may include a transition between sensor and IMU sources, and/or changing one or more sensor input selections to the gesture module 126 of the mobile device, such as for sensor inputs from any one or more of multiple different sensor data sources, to include multiple IMUs, proximity and ambient light sensors, etc. The gesture module 126 can then utilize the different gesture detection algorithm 150 that corresponds to the changed form factor 128 of the device to detect an instance of a gesture 138 performed by the user holding the mobile device 102 in the changed form factor.

Alternatively, the gesture module 126 can determine a change in the form factor 128 of the mobile device 102, replace an algorithm parameter value 148, or multiple parameter values, in a gesture detection algorithm 150 with respective updated parameter values, and use the updated parameter values 148 in the gesture detection algorithm 150 to detect an instance of the gesture 138 performed by the user holding the device in the changed form factor. The respective updated parameter values 148 would correspond to the changed form factor 128 of the mobile device 102, and a parameter value 148 may be an updated acceleration value and/or an updated rotational motion value of the mobile device 102 to account for a change in the device mass 130, the center of gravity 132, and/or a moment of inertia 134 of the mobile device corresponding to a change in device configuration. In implementations, the additional component 112 that is integrated with and/or attached to the mobile phone 110 may provide the updated algorithm parameter values 148 to the gesture module 126 that is implemented by the mobile phone, such as the updated acceleration value and/or the updated rotational motion value to account for the change in the device mass 130, the center of gravity 132, and/or a moment of inertia 134 of the mobile phone when the additional component 112 is attached to the device. In implementations, the parameter values 148 can include, but are not limited to, an acceleration value of the mobile device, a rotational motion value of the mobile device, one or more threshold values, timeout durations, multiplicative factors, offsets, and/or any other type of gesture detection algorithm parameter values.

Figure 2:
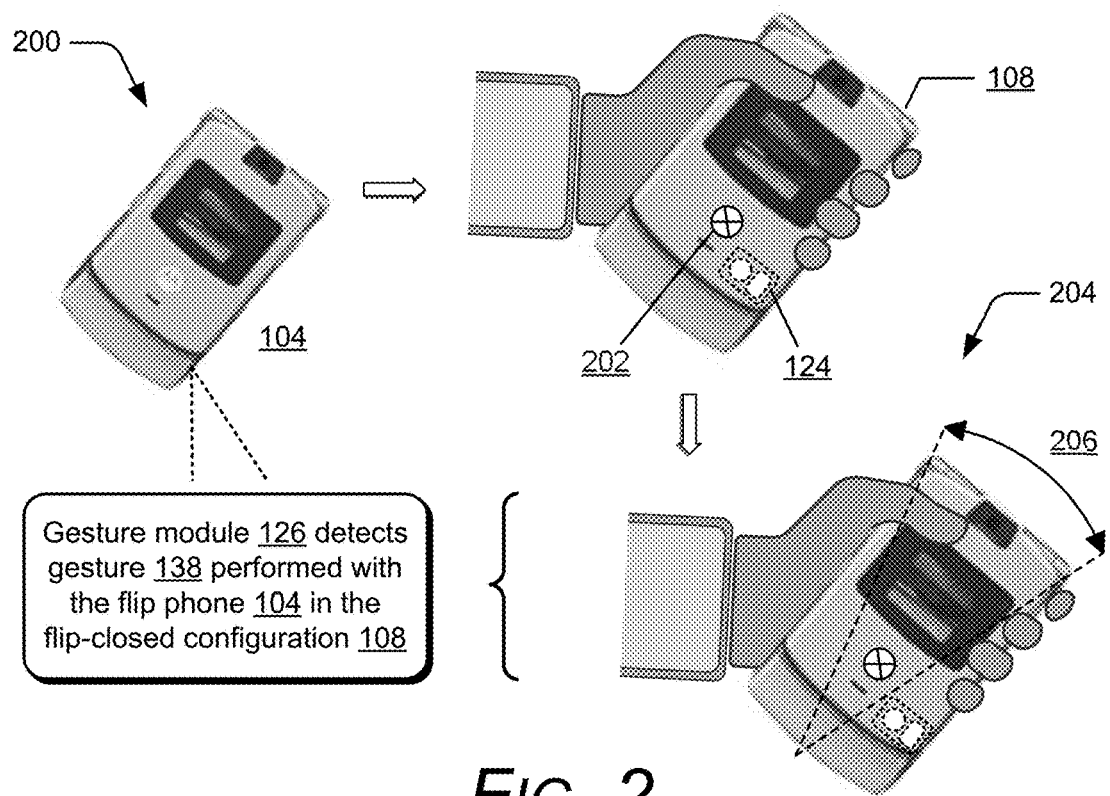
FIG. 2 illustrates an example of a user performing a gesture with a flip phone in a flip-closed configuration in accordance with one or more implementations of the techniques described herein.

FIG. 2 illustrates an example 200 of a user performing a gesture with the flip phone 104 (e.g., an implementation of the mobile device 102) in the flip-closed configuration 108 of the device. The flip phone 104 is shown being held by a user in the flip-closed configuration 108. An approximate location of the device sensors 124, such as an inertial measurement unit, within the device housing is shown with a representation of the gyroscope and accelerometer implemented as sensors of the inertial measurement unit. A center of gravity 202 of the flip phone 104 is also shown at an approximate location relative to the device sensors 124 in the flip-closed configuration 108 of the device. The center of gravity of the phone changes depending on the configuration (i.e., form factor) of the phone. At 204, the user holding the flip phone 104 in the flip-closed configuration 108 of the device is shown to perform a gesture as a double-chop motion that traces the shape of an arc 206. The center of gravity 202 of the flip phone 104 then changes depending on the configuration of the device in a different form factor, such as shown and described with reference to FIG. 3.

Figure 3:
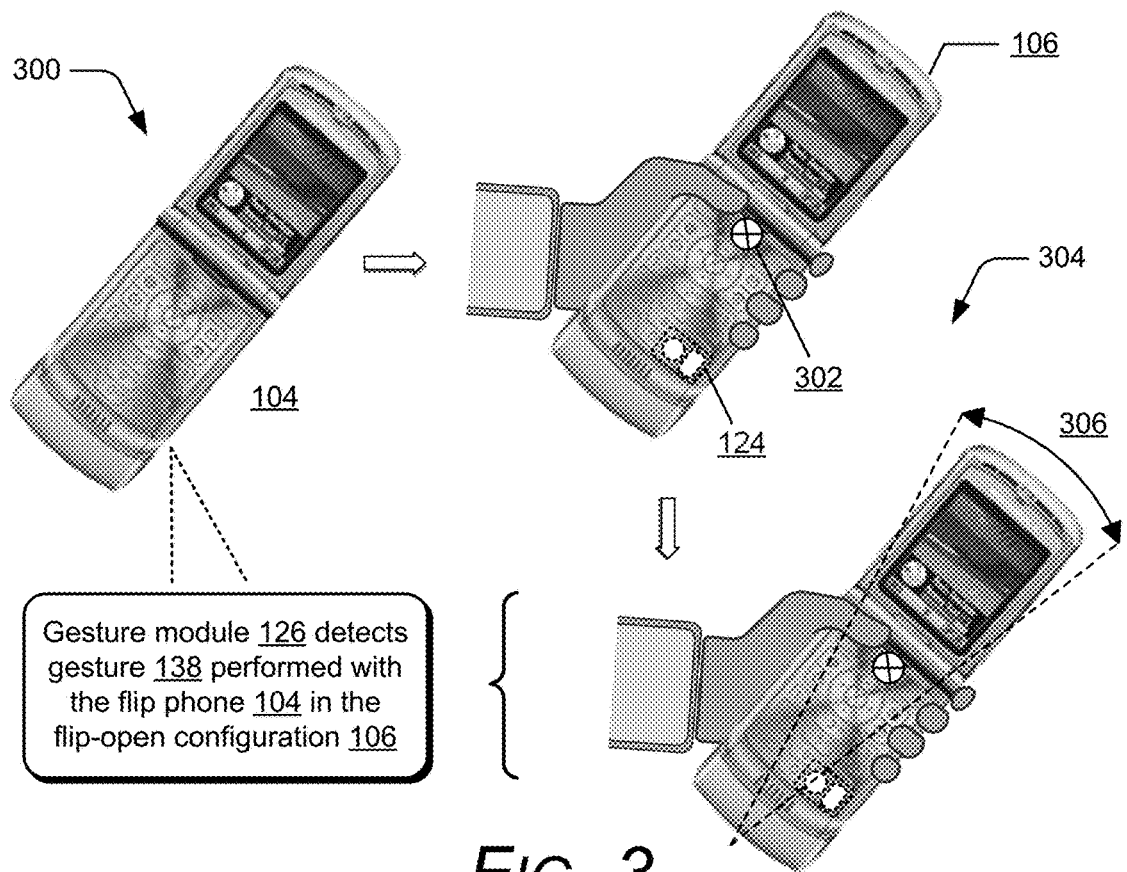
FIG. 3 illustrates an example of a user performing a gesture with a flip phone in a flip-open configuration in accordance with one or more implementations of the techniques described herein.

FIG. 3 illustrates an example 300 of a user performing a gesture with the flip phone 104 in the flip-open configuration 106 of the device. The flip phone 104 is shown being held by the user in the flip-open configuration 106, and as above, the approximate location of the device sensors 124 within the device housing is shown with a representation of a gyroscope and an accelerometer implemented as the sensors of an inertial measurement unit. A center of gravity 302 of the flip phone 104 is also shown at an approximate location relative to the device sensors 124 in the flip-open configuration 106 of the device. Notably, the center of gravity 302 of the flip phone 104 has changed relative to the location of the device sensors 124, as compared to the center of gravity 202 of the flip phone 104 in the flip-closed configuration 108 as shown in FIG. 2. At 304, the user holding the flip phone 104 in the flip-open configuration 106 of the device is shown to again perform the gesture as the double-chop motion that traces the shape of an arc 306 (e.g., approximately similar in motion as the shape of the arc 206.)

In comparing the motion inputs of the similar gesture performed in these two examples 200, 300, the flip phone 104 has a relatively lower center of gravity 202 in the flip-closed configuration 108 than the relatively higher center of gravity 302 in the flip-open configuration 106 of the device. Notably, the center of gravity 302 of the flip phone 104 in the flip-open configuration 106 (as shown in FIG. 3) has changed relative to the location of the device sensors 124, as compared to the center of gravity 202 of the flip phone 104 in the flip-closed configuration 108 (as shown in FIG. 2). In the flip-closed configuration 108 of the flip phone 104 with the relatively lower center of gravity 202, the gesture is performed against a smaller moment of inertia as compared to the flip phone 104 in the flip-open configuration 106 with the relatively higher center of gravity 302 and a larger moment of inertia. Generally, the moment of inertia 134 of an object (e.g., the flip phone 104 in this example) is a continuous distribution of mass at a continually varying distance from a rotation axis, such as of the coordinate system 136. Additionally, in the flip-closed configuration 108 of the flip phone 104, a gyroscope of the inertial measurement unit detects a relatively faster rotation on the z-axis, and more x-axis linear acceleration. Alternatively, in the flip-open configuration 106 of the flip phone 104, the gyroscope of the inertial measurement unit detects a relatively slower rotation on the z-axis, and less x-axis linear acceleration.

As detailed above, the gesture module 126 implemented by the flip phone 104 can determine the current form factor 128 of the device, such as in the flip-open configuration 106 or in the flip-closed configuration 108. The physical changes in device configuration, as related to the current form factor 128, can change the device mass 130, the center of gravity 132, and/or a moment of inertia 134 of the flip phone 104, particularly in reference to the position or location of the device sensors 124 in the device. Notably, devices that can change form factor, such as the flip phone 104, changes the center of gravity, mass of the device, and/or the moment of inertia, which can adversely impact gesture detection as the sensor inputs of gestures with reference to the coordinate system 136 (the x-axis, y-axis, and z-axis) are detected by the device sensors.

Accordingly, the gesture module 126 is implemented to determine the form factor 128 of the flip phone 104 as one of the device configurations, and then change gesture detection algorithms 150 and/or algorithm parameter values 148 to account for the changes in device configuration and maintain a similar, consistent feel when a user performs the gestures 138 while holding the device. In aspects of the techniques described herein, the gesture module 126 can select a gesture detection algorithm 150 that corresponds to the flip-closed configuration 108 of the flip phone 104 (i.e., the current form factor 128), determine a change from the flip-closed configuration 108 to the flip-open configuration 106 of the flip phone 104, and select a different gesture detection algorithm 150 that takes into account the change in device form factor.

Alternatively, the gesture module 126 implemented by the flip phone 104 can determine a change in the form factor 128 of the flip phone 104, replace one or more algorithm parameter values 148 in a gesture detection algorithm 150 with respective updated parameter values, and use the respective updated parameter values 148 in the gesture detection algorithm 150 to detect an instance of the gesture 138 performed by the user holding the device in the changed form factor. An updated parameter value 148 would correspond to the changed form factor 128 of the flip phone 104, such as from the flip-closed configuration 108 to the flip-open configuration 106 (or vice-versa). The parameter value 148 may be an updated acceleration value and/or an updated rotational motion value of the flip phone 104 to account for a change in the device mass 130, the center of gravity 132, and/or a moment of inertia 134 of the flip phone 104 corresponding to the change in device configuration. In implementations, the parameter values 148 can include, but are not limited to, an acceleration value of the mobile device, a rotational motion value of the mobile device, one or more threshold values, timeout durations, multiplicative factors, offsets, and/or any other type of gesture detection algorithm parameter values.

Example methods 400, 500, 600, 700, 800, 900, and 1000 are described with reference to respective FIGS. 4-10 in accordance with implementations of gesture detection based on device form factor. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
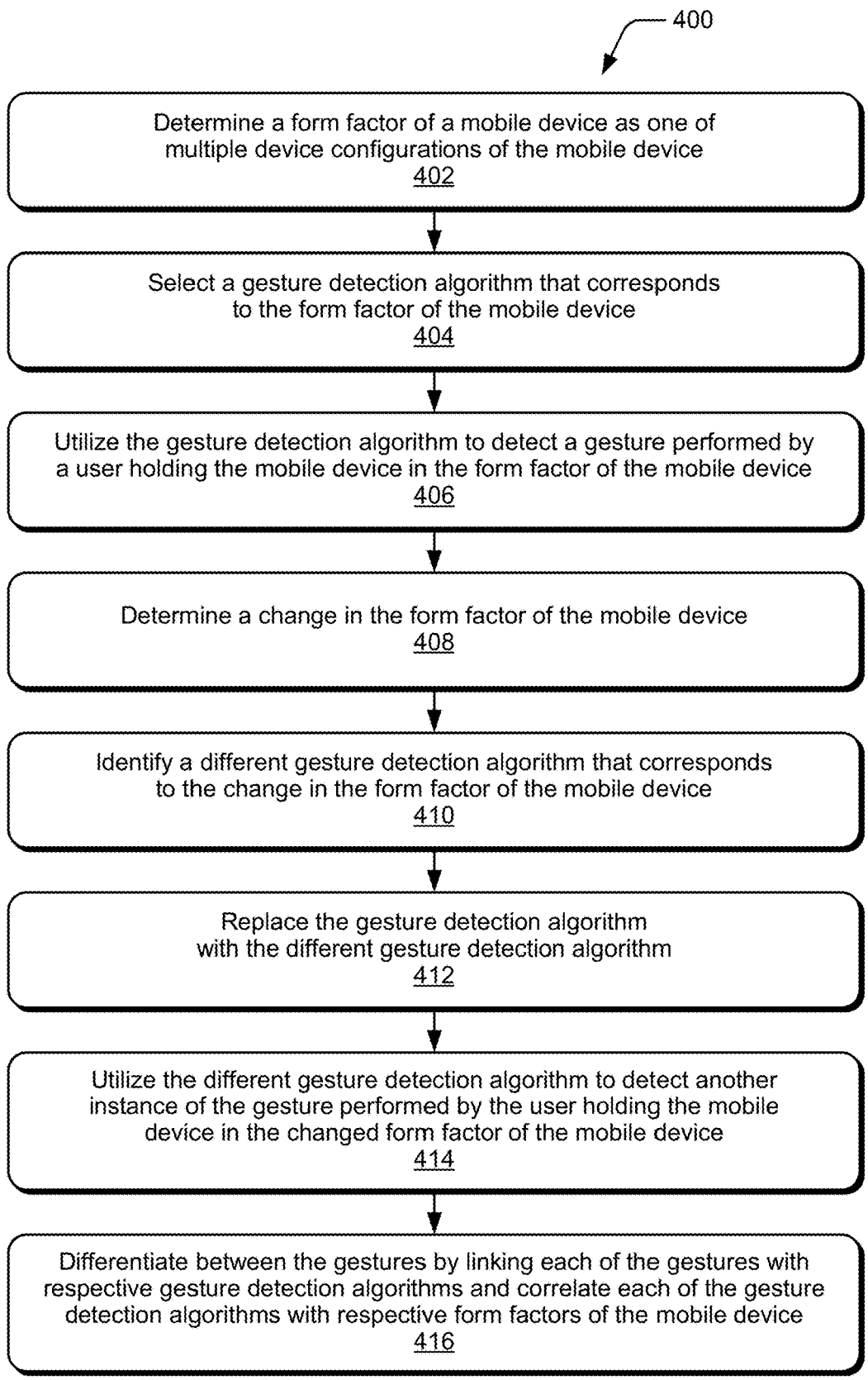
FIG. 4 illustrates an example method of gesture detection based on device form factor as implemented by a mobile device in accordance with one or more implementations of the techniques described herein, such as (in part) to select a gesture detection algorithm that corresponds to a form factor of the mobile device, determine a change in the device form factor, and replace the gesture detection algorithm with a different gesture detection algorithm that corresponds to the change in device form factor.

FIG. 4 illustrates example method(s) 400 of gesture detection based on device form factor, and is generally described with reference to the gesture module implemented by a mobile device. The order in which the method is described is not intended to be construed as a limitation, and any number or combination of the described method operations can be performed in any order to perform a method, or an alternate method.

At 402, a form factor of a mobile device is determined as one of multiple device configurations of the mobile device. For example, the gesture module 126 that is implemented by the mobile device 102 determines the form factor 128 of the mobile device 102 as one of multiple device configurations. In one example, the gesture module 126 determines the form factor 128 of the flip phone 104 as being in the flip-open configuration 106 or in the flip-closed configuration 108. In another example, the gesture module 126 determines the form factor 128 of the mobile phone 110 in the standard configuration 116 of the device, or in the component configuration 114 with an additional component 112 attached to or integrated with the device.

At 404, a gesture detection algorithm that corresponds to the form factor of the mobile device is selected. For example, the gesture module 126 selects a gesture detection algorithm 150 that corresponds to the current form factor 128 of the mobile device 102, such as the flip phone 104 in the flip-open configuration 106 or in the flip-closed configuration 108, or the mobile phone 110 in the component configuration 114 with the additional component 112 integrated or attached to the mobile phone or in the standard configuration 116 of the mobile phone. Notably, the physical changes in device configuration, as related to the current form factor 128 of a device, can change the device mass 130, the center of gravity 132, and/or a moment of inertia 134 of the mobile device 102, particularly in reference to the position or location of the device sensors 124 in the device. This can adversely impact gesture detection as the sensor inputs of gestures with reference to the coordinate system 136 (the x-axis, y-axis, and z-axis) are detected by the device sensors 124. Accordingly, the gesture module 126 determines the form factor 128 of the mobile device 102 and selects the gesture detection algorithm 150 that corresponds to the determines form factor of the device.

At 406, the gesture detection algorithm is utilized to detect a gesture performed by a user holding the mobile device in the form factor of the mobile device. For example, the gesture module 126 utilizes the gesture detection algorithm 150 to detect a gesture 138 performed by the user holding the mobile device 102 in the current form factor 128 of the mobile device. In an example, the gesture module 126 detects a gesture 138 performed by a user holding the flip phone 104 in the flip-open configuration 106 (i.e., a form factor 128) utilizing the gesture detection algorithm 150 that corresponds to the flip-open configuration of the device. Similarly, the gesture module 126 detects a gesture 138 performed by the user holding the flip phone 104 in the flip-closed configuration 108 (i.e., a form factor 128) utilizing a different gesture detection algorithm 150 that corresponds to the flip-closed configuration of the device. In another example, the gesture module 126 detects a gesture 138 performed by a user holding the mobile phone 110 that has the additional component 112 attached to the device in the component configuration 114 of the device utilizing the gesture detection algorithm 150 that corresponds to the component configuration 114 of the device. Similarly, the gesture module 126 detects a gesture 138 performed by the user holding the mobile phone 110 without the additional component 112 attached to the device in the standard configuration 116 of the device utilizing a different gesture detection algorithm 150 that corresponds to the standard configuration of the device.

At 408, a change in the form factor of the mobile device is determined. For example, the gesture module 126 determines a change in the current form factor 128 of the mobile device 102. In an example, the gesture module 126 determines a change in the form factor 128 of the flip phone 104, such as a change from the flip-open configuration 106 to the flip-closed configuration 108, or a change from the flip-closed configuration 108 to the flip-open configuration 106. In another example, the gesture module 126 determines a change in the form factor 128 of the mobile phone 110, such as a change from the standard configuration 116 of the device to the component configuration 114 with the additional component 112 integrated with or attached to the mobile phone (or vice-versa). In implementations, the gesture module 126 receives one or more parameters from the additional component 112 that is integrated with and/or attached to the mobile phone 110, such as updated algorithm parameter values 148 provided to the gesture module 126, such as an updated acceleration value and/or an updated rotational motion value to account for the change in the device mass 130, the center of gravity 132, and/or a moment of inertia 134 of the mobile phone when the additional component 112 is attached to the device.

At 410, a different gesture detection algorithm that corresponds to the change in the form factor of the mobile device is identified and, at 412, the gesture detection algorithm is replaced with the different gesture detection algorithm. For example, the gesture module 126 identifies a different gesture detection algorithm 150 that corresponds to the change in the form factor 128 of the mobile device 102, and replaces the gesture detection algorithm with the different gesture detection algorithm that corresponds to the different device form factor. In implementations, replacing the gesture detection algorithm 150 may include a transition between sensor and IMU sources, and/or changing one or more sensor input selections to the gesture module 126 of the mobile device, such as for sensor inputs from any one or more of multiple different sensor data sources, to include multiple IMUS, proximity and ambient light sensors, etc.

In an example, the gesture module 126 implemented by the flip phone 104 replaces the gesture detection algorithm 150 that corresponds to the flip-closed configuration 108 of the flip phone with a different gesture detection algorithm 150 that corresponds to the flip-open configuration 106 of the flip phone. Notably, the gesture detection algorithm 150 that is selected as corresponding to the flip-open configuration 106 of the flip phone 104 varies from the gesture detection algorithm 150 that is selected as corresponding to the flip-closed configuration 108 of the flip phone, primarily taking into account the differences in device mass 130, center of gravity 132, and/or a moment of inertia 134 associated with the different device configurations. Similarly, the gesture module 126 implemented by the mobile phone 110 replaces the gesture detection algorithm 150 that corresponds to the standard configuration 116 of the device with a different gesture detection algorithm 150 that corresponds to the component configuration 114 of the device. Notably, the gesture detection algorithm 150 that is selected as corresponding to the component configuration 114 of the mobile phone 110 varies from the gesture detection algorithm 150 that is selected as corresponding to the standard configuration 116 of the mobile phone, primarily taking into account the differences in device mass 130, center of gravity 132, and/or a moment of inertia 134 associated with the different device configurations.

At 414, the different gesture detection algorithm is utilized to detect another instance of a gesture performed by the user holding the mobile device in the changed form factor of the mobile device. For example, the gesture module 126 utilizes the different gesture detection algorithm 150 to detect another instance of the gesture 138 performed by the user holding the mobile device 102 in the changed form factor of the device.

At 416, gestures are differentiated by linking each of the gestures with respective gesture detection algorithms, and each of the gesture detection algorithms are correlated with respective form factors of the mobile device. For example, the gesture module 126 links each of the different types of gestures 138 with respective gesture detection algorithms 150, and then correlates each of the gesture detection algorithms 150 with respective form factors 128 of the mobile device 102. For example, a user holding the mobile device 102 may perform any number of different types of gestures 138, such as swiveling, twisting, lifting, flipping, chopping, or a rotating motion, to name a few. In implementations, each of the different types of gestures 138 are associated with a respective gesture detection algorithm 150, and the gesture detection algorithms are correlated with the various different form factors 128 of the mobile device.

Figure 5:
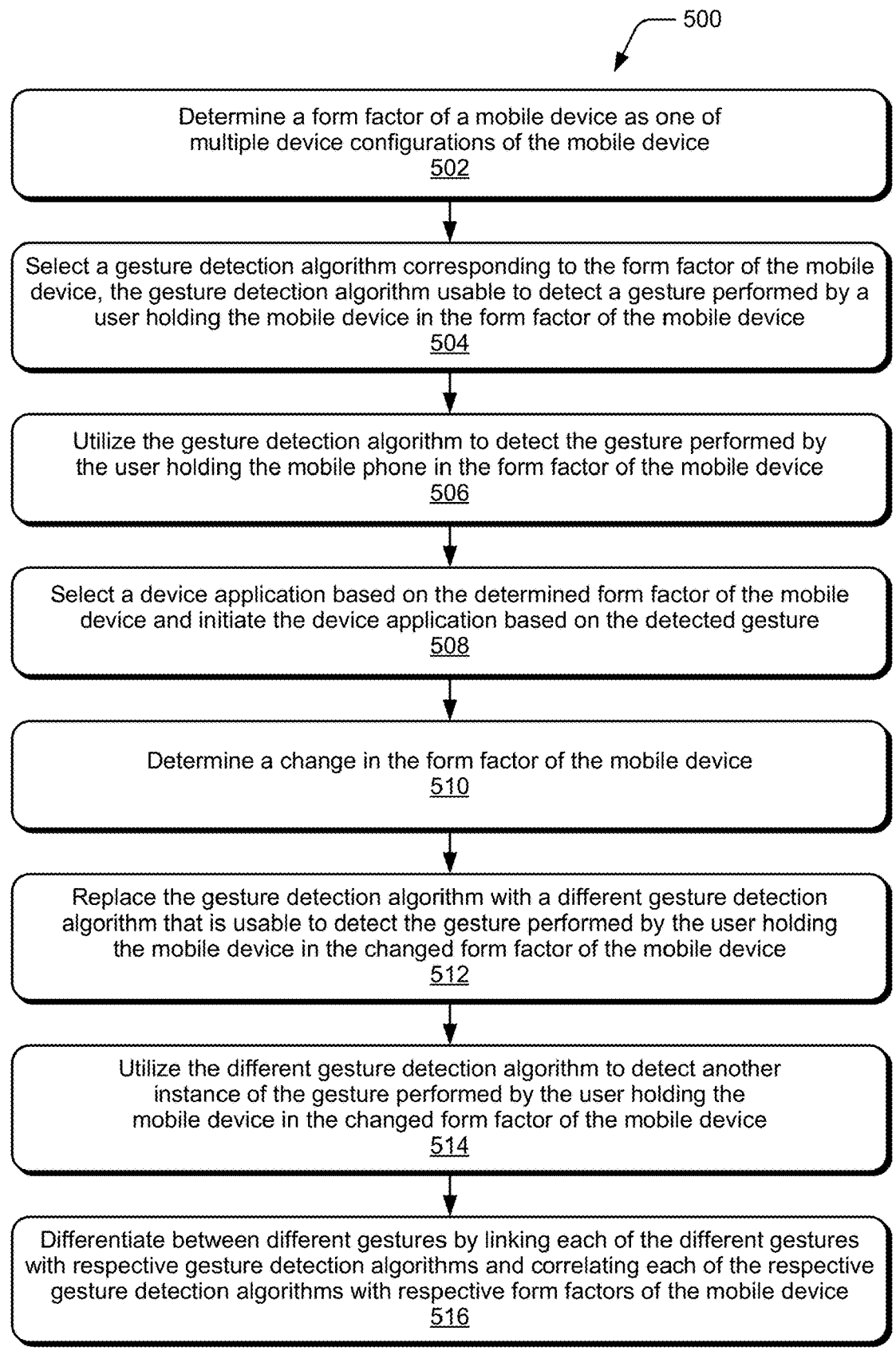
FIG. 5 illustrates an example method of gesture detection based on device form factor as implemented by a mobile device in accordance with one or more implementations of the techniques described herein, such as (in part) to select a gesture detection algorithm that corresponds to a form factor of the mobile device, detect a gesture using the gesture detection algorithm, and initiate a device application based on the detected gesture using the gesture detection algorithm.

FIG. 5 illustrates example method(s) 500 of gesture detection based on device form factor, and is generally described with reference to the gesture module implemented by a mobile device. The order in which the method is described is not intended to be construed as a limitation, and any number or combination of the described method operations can be performed in any order to perform a method, or an alternate method.

At 502, a form factor of a mobile device is determined as one of multiple device configurations of the mobile device. For example, the gesture module 126 that is implemented by the mobile device 102 determines the form factor 128 of mobile device 102 as one of multiple device configurations. In one example, the gesture module 126 determines the form factor 128 of the flip phone 104 as being in the flip-open configuration 106 or in the flip-closed configuration 108. In another example, the gesture module 126 determines the form factor 128 of the mobile phone 110 in the standard configuration 116 of the device, or in the component configuration 114 with an additional component 112 attached to or integrated with the device.

At 504, a gesture detection algorithm that corresponds to the form factor of the mobile device is selected, the gesture detection algorithm being usable to detect a gesture performed by a user holding the mobile device in the form factor of the mobile device. For example, the gesture module 126 selects the gesture detection algorithm 150 that corresponds to the current form factor 128 of the mobile device 102, such as the flip phone 104 in the flip-open configuration 106 or in the flip-closed configuration 108, or the mobile phone 110 in the component configuration 114 with the additional component 112 integrated or attached to the mobile phone or in the standard configuration 116 of the mobile phone. Notably, the physical changes in device configuration, as related to the current form factor 128 of a device, can change the mass 130, the center of gravity 132, and/or a moment of inertia 134 of the mobile device 102, particularly in reference to the position or location of the device sensors 124 in the device. This can adversely impact gesture detection as the sensor inputs of gestures with reference to the coordinate system 136 (the x-axis, y-axis, and z-axis) are detected by the device sensors 124. Accordingly, the gesture module 126 determines the form factor 128 of the mobile device 102 and selects the gesture detection algorithm 150 that corresponds to the determined form factor of the device.

At 506, the gesture detection algorithm is utilized to detect the gesture performed by the user holding the mobile device in the form factor of the mobile device. For example, the gesture module 126 utilizes the gesture detection algorithm 150 to detect a gesture 138 performed by the user holding the mobile device 102 in the current form factor 128 of the mobile device. In an example, the gesture module 126 detects a gesture 138 performed by a user holding the flip phone 104 in the flip-open configuration 106 (i.e., a form factor 128) utilizing the gesture detection algorithm 150 that corresponds to the flip-open configuration of the device. Similarly, the gesture module 126 detects a gesture 138 performed by the user holding the flip phone 104 in the flip-closed configuration 108 (i.e., a form factor 128) utilizing a different gesture detection algorithm 150 that corresponds to the flip-closed configuration of the device. In another example, the gesture module 126 detects a gesture 138 performed by a user holding the mobile phone 110 that has the additional component 112 attached to the device in the component configuration 114 of the device utilizing the gesture detection algorithm 150 that corresponds to the component configuration 114 of the device. Similarly, the gesture module 126 detects a gesture 138 performed by the user holding the mobile phone 110 without the additional component 112 attached to the device in the standard configuration 116 of the device utilizing a different gesture detection algorithm 150 that corresponds to the standard configuration of the device.

At 508, a device application is selected based on the determined form factor of the mobile device and initiated based on the detected gesture. For example, a device application 140 can be selected based on the determined form factor 128 of the mobile device 102, and the gesture module 126 initiates a device application 140 upon detecting the gesture 138 using the gesture detection algorithm 150 that corresponds to the current device configuration of the device.

At 510, a change in the form factor of the mobile device is determined. For example, the gesture module 126 determines a change in the current form factor 128 of the mobile device 102. In an example, the gesture module 126 determines a change in the form factor 128 of the flip phone 104, such as a change from the flip-open configuration 106 to the flip-closed configuration 108, or a change from a flip-closed configuration 108 to a flip-open configuration 106. In another example, the gesture module 126 determines a change in the form factor 128 of the mobile phone 110, such as a change from the standard configuration 116 of the device to the component configuration 114 with the additional component 112 integrated or attached to the mobile phone (or vice-versa). In implementations, the gesture module 126 receives one or more parameters from the additional component 112 that is integrated with and/or attached to the mobile phone 110, such as updated algorithm parameter values 148 provided to the gesture module 126, such as an updated acceleration value and/or an updated rotational motion value to account for the change in the device mass 130, the center of gravity 132, and/or a moment of inertia 134 of the mobile phone when the additional component 112 is attached to the device.

At 512, the gesture detection algorithm is replaced with a different gesture detection algorithm that is usable to detect the gesture performed by the user holding the mobile device in the changed form factor of the mobile device. For example, the gesture module 126 identifies a different gesture detection algorithm 150 that corresponds to the change in the form factor 128 of the mobile device 102, and replaces the gesture detection algorithm with the different gesture detection algorithm that corresponds to the different device form factor. In implementations, replacing the gesture detection algorithm 150 may include a transition between sensor and IMU sources, and/or changing one or more sensor input selections to the gesture module 126 of the mobile device, such as for sensor inputs from any one or more of multiple different sensor data sources, to include multiple IMUs, proximity and ambient light sensors, etc.

In an example, the gesture module 126 implemented by the flip phone 104 replaces the gesture detection algorithm 150 that corresponds to the flip-closed configuration 108 of the flip phone with a different gesture detection algorithm 150 that corresponds to the flip-open configuration 106 of the flip phone. Notably, the gesture detection algorithm 150 that is selected as corresponding to the flip-open configuration 106 of the flip phone 104 varies from the gesture detection algorithm 150 that is selected as corresponding to the flip-closed configuration 108 of the flip phone, primarily taking into account the differences in device mass 130, center of gravity 132, and/or a moment of inertia 134 associated with the different device configurations. Similarly, the gesture module 126 implemented by the mobile phone 110 replaces the gesture detection algorithm 150 that corresponds to the standard configuration 116 of the device with a different gesture detection algorithm 150 that corresponds to the component configuration 114 of the device. Notably, the gesture detection algorithm 150 that is selected as corresponding to the component configuration 114 of the mobile phone 110 varies from the gesture detection algorithm 150 that is selected as corresponding to the standard configuration 116 of the mobile phone, primarily taking into account the differences in device mass 130, center of gravity 132, and/or a moment of inertia 134 associated with the different device configurations.

At 514, the different gesture detection algorithm is utilized to detect another instance of the gesture performed by the user holding the mobile device in the changed form factor of the mobile device. For example, the gesture module 126 utilizes the different gesture detection algorithm 150 to detect another instance of the gesture 138 performed by the user holding the mobile device 102 in the changed form factor of the device.

At 516, different gestures are differentiated by linking each of the different gestures with respective gesture detection algorithms, and each of the gesture detection algorithms are correlated with respective form factors of the mobile device. For example, the gesture module 126 links each of the different types of gestures 138 with respective gesture detection algorithms 150, and then correlates each of the gesture detection algorithms 150 with respective form factors 128 of the mobile device 102.

Figure 6:
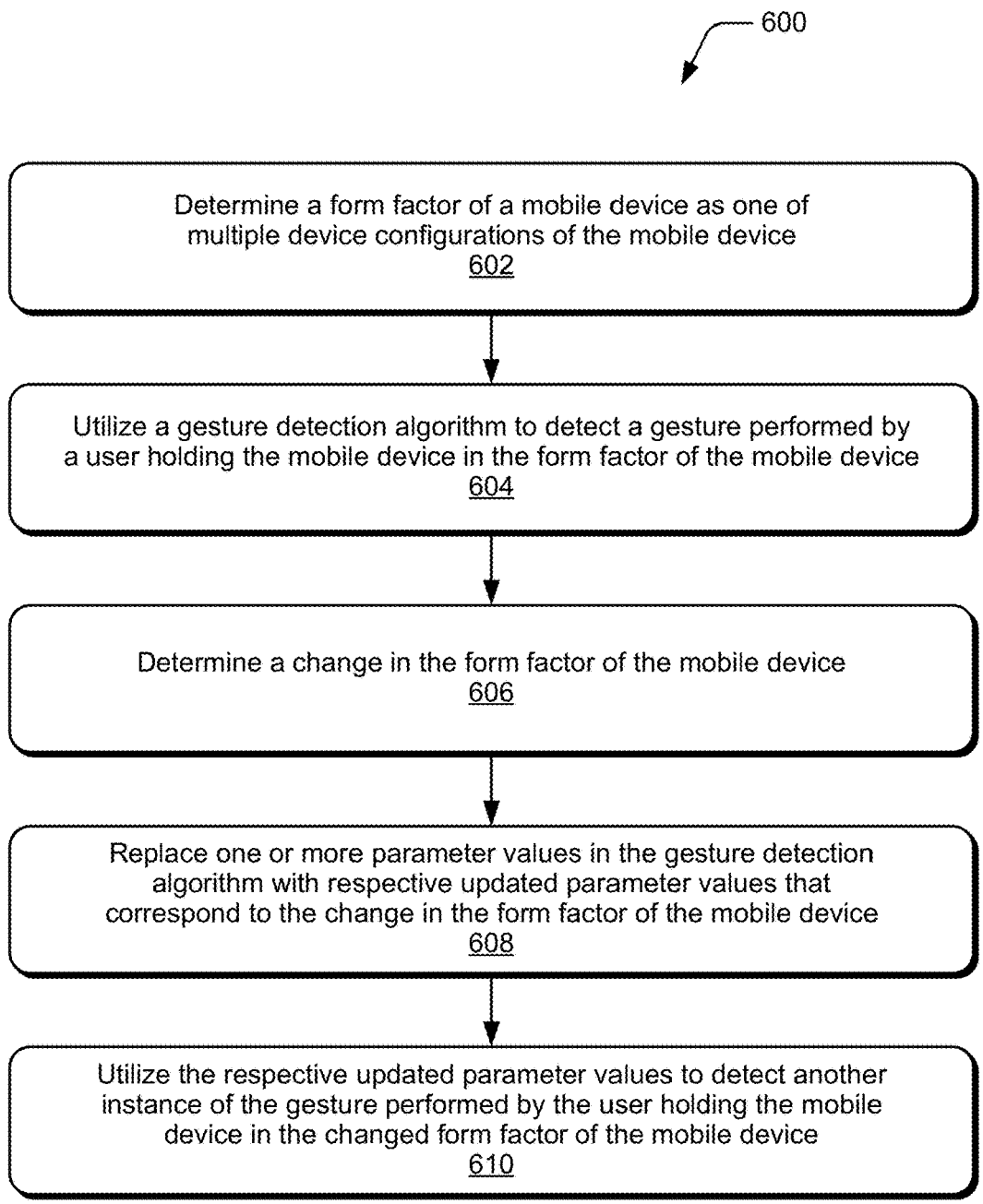
FIG. 6 illustrates an example method of gesture detection based on device form factor as implemented by a mobile device in accordance with one or more implementations of the techniques described herein, such as (in part) to detect a gesture using a gesture detection algorithm, determine a change in the form factor of the mobile device, update parameter value(s) of the gesture detection algorithm, and detect another instance of the gesture utilizing the updated gesture detection algorithm.

FIG. 6 illustrates example method(s) 600 of gesture detection based on device form factor, and is generally described with reference to the gesture module implemented by a mobile device. The order in which the method is described is not intended to be construed as a limitation, and any number or combination of the described method operations can be performed in any order to perform a method, or an alternate method.

At 602, a form factor of a mobile device is determined as one of multiple device configurations of the mobile device. For example, the gesture module 126 that is implemented by the mobile device 102 determines the form factor 128 of mobile device 102 as one of multiple device configurations. In one example, the gesture module 126 determines the form factor 128 of the flip phone 104 as being in the flip-open configuration 106 or in the flip-closed configuration 108. In another example, the gesture module 126 determines the form factor 128 of the mobile phone 110 in the standard configuration 116 of the device, or in the component configuration 114 with an additional component 112 attached to or integrated with the device.

At 604, a gesture detection algorithm is utilized to detect a gesture performed by the user holding the mobile device in the form factor of the mobile device. For example, the gesture module 126 utilizes the gesture detection algorithm 150 to detect a gesture 138 performed by the user holding the mobile device 102 in the current form factor 128 of the mobile device. In an example, the gesture module 126 detects a gesture 138 performed by a user holding the flip phone 104 in the flip-open configuration 106 (i.e., a form factor 128) utilizing the gesture detection algorithm 150 that corresponds to the flip-open configuration of the device. Similarly, the gesture module 126 detects a gesture 138 performed by the user holding the flip phone 104 in the flip-closed configuration 108 (i.e., a form factor 128) utilizing a different gesture detection algorithm 150 that corresponds to the flip-closed configuration of the device.

In another example, the gesture module 126 detects a gesture 138 performed by a user holding the mobile phone 110 that has the additional component 112 attached to the device in the component configuration 114 of the device utilizing the gesture detection algorithm 150 that corresponds to the component configuration 114 of the device. Similarly, the gesture module 126 detects a gesture 138 performed by the user holding the mobile phone 110 without the additional component 112 attached to the device in the standard configuration 116 of the device utilizing a different gesture detection algorithm 150 that corresponds to the standard configuration of the device.

At 606, a change in the form factor of the mobile device is determined. For example, the gesture module 126 determines a change in the current form factor 128 of the mobile device 102. In an example, the gesture module 126 determines a change in the form factor 128 of the flip phone 104, such as a change from the flip-open configuration 106 to the flip-closed configuration 108, or a change from the flip-closed configuration 108 to the flip-open configuration 106. In another example, the gesture module 126 determines a change in the form factor 128 of the mobile phone 110, such as a change from the standard configuration 116 of the device to the component configuration 114 with the additional component 112 integrated or attached to the mobile phone (or vice-versa). In implementations, the gesture module 126 receives one or more parameters from the additional component 112 that is integrated with and/or attached to the mobile phone 110, such as updated algorithm parameter values 148 provided to the gesture module 126, such as an updated acceleration value and/or an updated rotational motion value to account for the change in the device mass 130, the center of gravity 132, and/or a moment of inertia 134 of the mobile phone when the modular attachment is attached to the device.

At 608, one or more parameter values in a gesture detection algorithm are replaced with respective updated parameter values that correspond to the change in the form factor of the mobile device. For example, the gesture module 126 replaces one or more of the parameter values 148 in a gesture detection algorithm 150 with respective updated parameter values, where the respective updated parameter values 148 can indicate an inertial measurement that corresponds to the change in the form factor 128 of the mobile device 102. An updated parameter value 148 can correspond to the changed form factor 128 of the mobile device 102, and the parameter value 148 may be an updated acceleration value and/or an updated rotational motion value of the mobile device 102 to account for a change in the device mass 130, the center of gravity 132, and/or a moment of inertia 134 of the mobile device corresponding to a change in device configuration. In implementations, the parameter values 148 can include, but are not limited to, an acceleration value of the mobile device, a rotational motion value of the mobile device, one or more threshold values, timeout durations, multiplicative factors, offsets, and/or any other type of gesture detection algorithm parameter values.

In implementations, the additional component 112 that is integrated with and/or attached to the mobile phone 110 may provide the updated algorithm parameter values 148 to the gesture module 126 that is implemented by the mobile phone, such as the updated acceleration value and/or the updated rotational motion value to account for the change in the device mass 130, the center of gravity 132, and/or a moment of inertia 134 of the mobile phone when the additional component 112 is attached to the device. In an example, the gesture module 126 implemented by the flip phone 104 replaces an algorithm parameter value 148 in the gesture detection algorithm 150 that corresponds to the flip-closed configuration 108 of the flip phone with a different parameter value that corresponds to the flip-open configuration 106 of the flip phone. Similarly, the gesture module 126 implemented by the mobile phone 110 replaces an algorithm parameter value 148 in the gesture detection algorithm 150 that corresponds to the standard configuration 116 of the device with a different parameter value that corresponds to the component configuration 114 of the device.

At 610, the respective updated parameter values are utilized to detect another instance of the gesture performed by the user holding the mobile device in the changed form factor of the mobile device. For example, the gesture module 126 utilizes the gesture detection algorithm 150 with the one or more updated parameter values 148 to detect another instance of the gesture 138 performed by the user holding the mobile device 102 in the changed form factor of the device.

Figure 7:
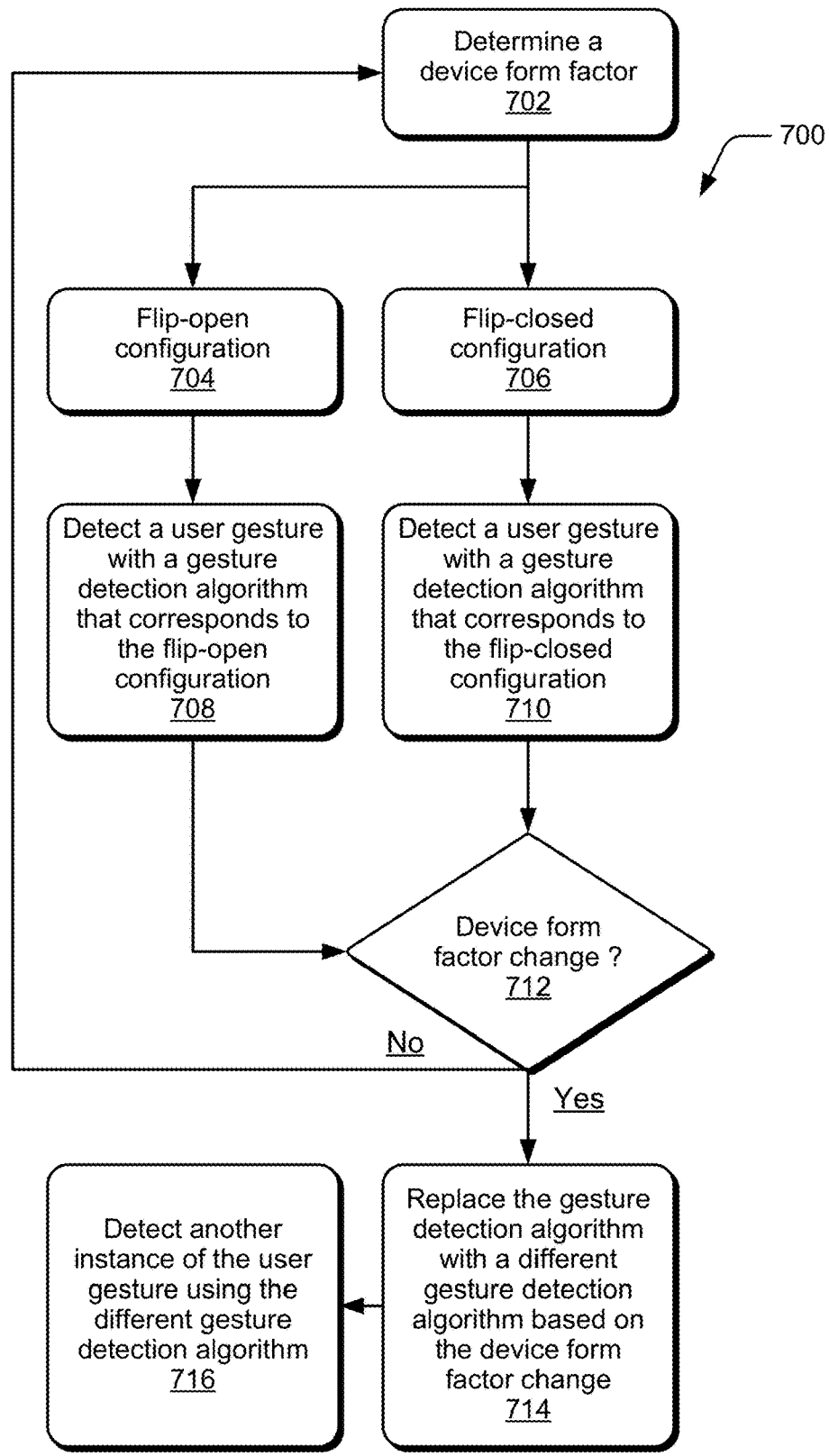
FIG. 7 illustrates an example method of the techniques for gesture detection based on device form factor as implemented by a flip phone. Upon determining a change in the device form factor, such as a change from a flip-open configuration to a flip-closed configuration (or vice-versa), a gesture detection algorithm is replaced with a different gesture detection algorithm.

FIG. 7 illustrates example method(s) 700 of gesture detection based on device form factor, implemented by a flip phone. Upon determining a change in the device form factor, such as a change from a flip-open configuration to a flip-closed configuration (or vice-versa), a gesture detection algorithm is replaced with a different gesture detection algorithm. The order in which the method is described is not intended to be construed as a limitation, and any number or combination of the described method operations can be performed in any order to perform a method, or an alternate method.

At 702, a form factor of a flip phone is determined as one of a flip-open configuration of the flip phone (at 704) or a flip-closed configuration of the flip phone (at 706). For example, the gesture module 126 implemented by the flip phone 104 determines the form factor 128 of the device as being in one of the flip-open configuration 106 or in the flip-closed configuration 108.

At 708, a user gesture is detected with a gesture detection algorithm that corresponds to the flip phone in the flip-open configuration. Alternatively at 710, a user gesture is detected with the gesture detection algorithm that corresponds to the flip phone in the flip-closed configuration. For example, the gesture module 126 implemented by the flip phone 104 detects a user gesture 138 utilizing the respective gesture detection algorithm 150 that corresponds to either the flip-open configuration 106 or the flip-closed configuration 108 of the flip phone.

At 712, a determination is made as to whether there has been a change in the device form factor. For example, the gesture module 126 determines whether the current form factor 128 of the flip phone 104 has changed, such as a change from the flip-open configuration 106 to the flip-closed configuration 108, or a change from the flip-closed configuration 108 to the flip-open configuration 106. If there is no determined change in the device form factor (i.e., "No" from 712), then the method continues at 702 to determine the device form factor.

If there is a change in the device form factor of the flip phone (i.e., "Yes" from 712), then at 714, the gesture detection algorithm is replaced with a different gesture detection algorithm based on the form factor change. For example, the gesture module 126 implemented by the flip phone 104 replaces the gesture detection algorithm 150 that corresponds to the flip-open configuration 106 of the device with a different gesture detection algorithm, namely one that corresponds to the flip-closed configuration 108 of the device (or vice-versa). Notably, the gesture detection algorithm 150 that corresponds to the flip-open configuration 106 of the flip phone 104 varies from the gesture detection algorithm 150 that corresponds to the flip-closed configuration 108 of the flip phone, primarily taking into account the differences in device mass 130, center of gravity 132, and/or a moment of inertia 134 associated with the different device configurations.

At 716, the different gesture detection algorithm is used to detect another instance of the user gesture. For example, the gesture module 126 utilizes the different gesture detection algorithm 150 to detect another instance of the gesture 138 performed by the user holding the flip phone 104 in the changed form factor of the device, either a change from the flip-open configuration 106 to the flip-closed configuration 108, or a change from the flip-closed configuration 108 to the flip-open configuration 106.

Figure 8:
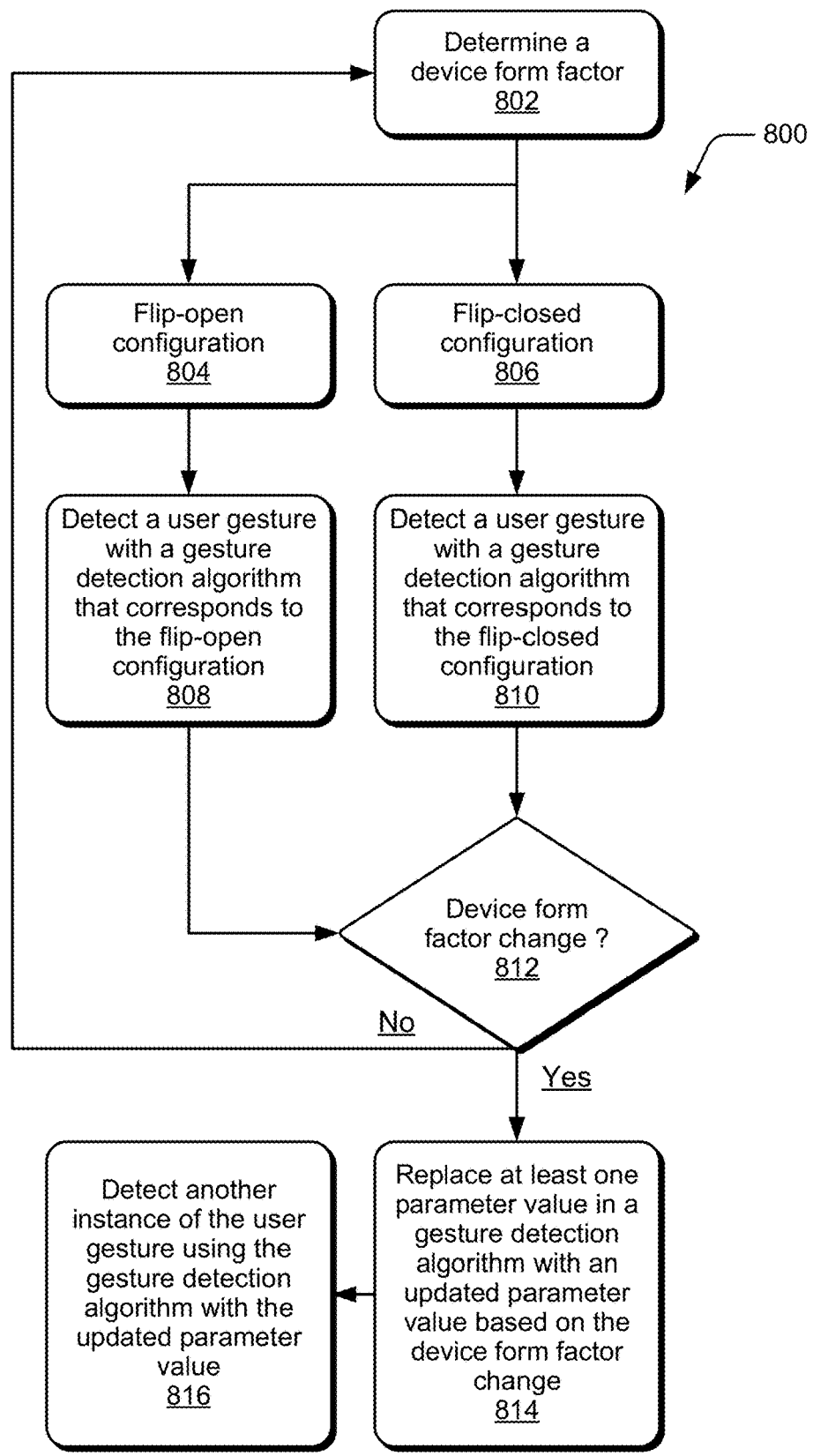
FIG. 8 illustrates another example method of the techniques for gesture detection based on device form factor as implemented by a flip phone. Upon determining a change in the device form factor, such as a change from a flip-open configuration to a flip-closed configuration (or vice-versa), at least one parameter value in a gesture detection algorithm is replaced with a respective updated parameter value.

FIG. 8 illustrates additional example method(s) 800 of gesture detection based on device form factor, implemented by a flip phone. Upon determining a change in the device form factor, such as a change from a flip-open configuration to a flip-closed configuration (or vice-versa), at least one parameter value in a gesture detection algorithm is replaced with a respective updated parameter value. The order in which the method is described is not intended to be construed as a limitation, and any number or combination of the described method operations can be performed in any order to perform a method, or an alternate method.

At 802, a form factor of a flip phone is determined as one of a flip-open configuration of the flip phone (at 804) or a flip-closed configuration of the flip phone (at 806). For example, the gesture module 126 implemented by the flip phone 104 determines the form factor 128 of the device as being in one of the flip-open configuration 106 or in the flip-closed configuration 108.

At 808, a user gesture is detected with a gesture detection algorithm that corresponds to the flip phone in the flip-open configuration. Alternatively at 810, a user gesture is detected with the gesture detection algorithm that corresponds to the flip phone in the flip-closed configuration. For example, the gesture module 126 implemented by the flip phone 104 detects a user gesture 138 utilizing the respective gesture detection algorithm 150 that corresponds to either the flip-open configuration 106 or the flip-closed configuration 108 of the flip phone.

At 812, a determination is made as to whether there has been a change in the device form factor. For example, the gesture module 126 determines whether the current form factor 128 of the flip phone 104 has changed, such as a change from the flip-closed configuration 108 to the flip-open configuration 106, or a change from the flip-open configuration 106 to the flip-closed configuration 108 of the device. If there is no determined change in the device form factor (i.e., "No" from 812), then the method continues at 802 to determine the device form factor.

If there is a change in the device form factor of the flip phone (i.e., "Yes" from 812), then at 814, at least one parameter value in the gesture detection algorithm is replaced with an updated parameter value based on the form factor change. For example, the gesture module 126 implemented by the flip phone 104 replaces at least one parameter value in the gesture detection algorithm 150 that corresponds to the flip-open configuration 106 of the device with an updated parameter value, namely one that corresponds to the flip-closed configuration 108 of the device (or vice-versa). The parameter value 148 may be an updated acceleration value and/or an updated rotational motion value of the flip phone 104 to account for a change in the device mass 130, the center of gravity 132, and/or a moment of inertia 134 of the flip phone 104 corresponding to the change in device configuration. In implementations, the parameter values 148 can include, but are not limited to, an acceleration value of the mobile device, a rotational motion value of the mobile device, one or more threshold values, timeout durations, multiplicative factors, offsets, and/or any other type of gesture detection algorithm parameter values.

At 816, the gesture detection algorithm with the updated parameter value is used to detect another instance of the user gesture. For example, the gesture module 126 utilizes the gesture detection algorithm 150 with the updated parameter value 148 to detect another instance of the gesture 138 performed by the user holding the flip phone 104 in the changed form factor of the device, either a change from the flip-open configuration 106 to the flip-closed configuration 108, or a change from the flip-closed configuration 108 to the flip-open configuration 106 of the device.

Figure 9:
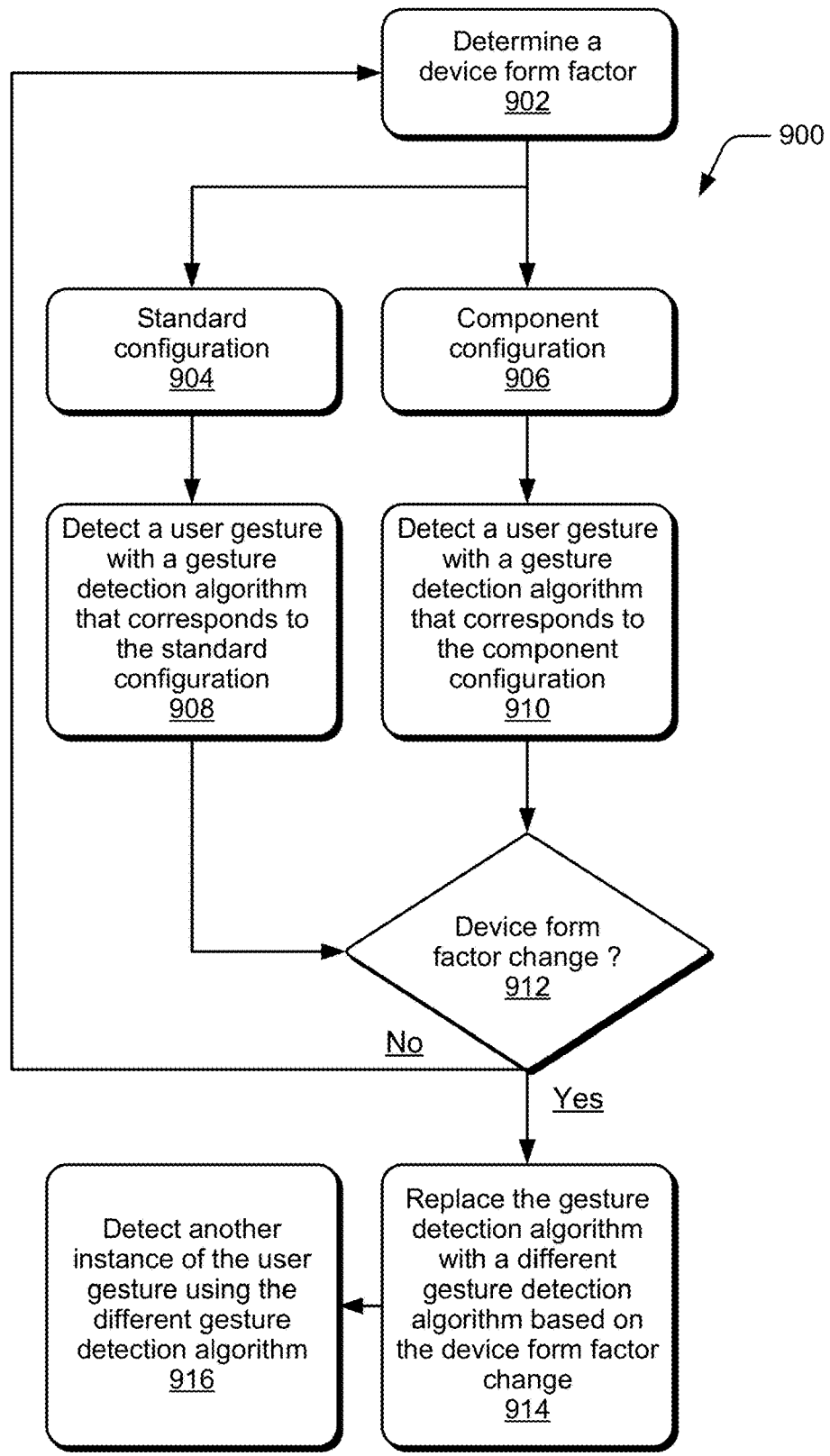
FIG. 9 illustrates an example method of the techniques for gesture detection based on device form factor as implemented by a mobile phone. Upon determining a change in the device form factor, such as a change from a standard configuration to an attached component configuration (or vice-versa), a gesture detection algorithm is replaced with a different gesture detection algorithm.

FIG. 9 illustrates example method(s) 900 of gesture detection based on device form factor, implemented by a mobile device. Upon determining a change in the device form factor, such as a change from a standard configuration to an attached component configuration (or vice-versa), a gesture detection algorithm is replaced with a different gesture detection algorithm. The order in which the method is described is not intended to be construed as a limitation, and any number or combination of the described method operations can be performed in any order to perform a method, or an alternate method.

At 902, a form factor of a mobile phone is determined as one of a standard configuration of the mobile phone (at 904) or a component configuration of the mobile phone (at 906). For example, the gesture module 126 implemented by the mobile phone 110 determines the form factor 128 of the device as one of the standard configuration 116 of the device, or in the attached component configuration 114 with an additional component 112 attached to or integrated with the device.

At 908, a user gesture is detected with a gesture detection algorithm that corresponds to the mobile phone in the standard configuration. Alternatively at 910, a user gesture is detected with the gesture detection algorithm that corresponds to the mobile phone in the component configuration. For example, the gesture module 126 implemented by the mobile phone 110 detects a user gesture 138 utilizing the respective gesture detection algorithm 150 that corresponds to either the standard configuration 116 of the device, or in the component configuration 114 with an additional component 112 attached to or integrated with the device.

At 912, a determination is made as to whether there has been a change in the device form factor. For example, the gesture module 126 determines whether the current form factor 128 of the mobile phone 110 has changed, such as a change from the standard configuration 116 to the component configuration 114, or a change from the component configuration 114 to the standard configuration 116 of the device. If there is no determined change in the device form factor (i.e., "No" from 912), then the method continues at 902 to determine the device form factor.

If there is a change in the device form factor of the mobile phone (i.e., "Yes" from 912), then at 914, the gesture detection algorithm is replaced with a different gesture detection algorithm based on the form factor change. For example, the gesture module 126 implemented by the mobile phone 110 replaces the gesture detection algorithm 150 that corresponds to the standard configuration 116 of the device with a different gesture detection algorithm, namely one that corresponds to the component configuration 114 of the device (or vice-versa). Notably, the gesture detection algorithm 150 that corresponds to the standard configuration 116 of the mobile phone 110 varies from the gesture detection algorithm 150 that corresponds to the component configuration 114 of the mobile phone, primarily taking into account the differences in device mass 130, center of gravity 132, and/or a moment of inertia 134 associated with the different device configurations.

At 916, the different gesture detection algorithm is used to detect another instance of the user gesture. For example, the gesture module 126 utilizes the different gesture detection algorithm 150 to detect another instance of the gesture 138 performed by the user holding the mobile phone 110 in the changed form factor of the device, either a change from the standard configuration 116 to the component configuration 114, or a change from the component configuration 114 to the standard configuration 116 of the device.

Figure 10:
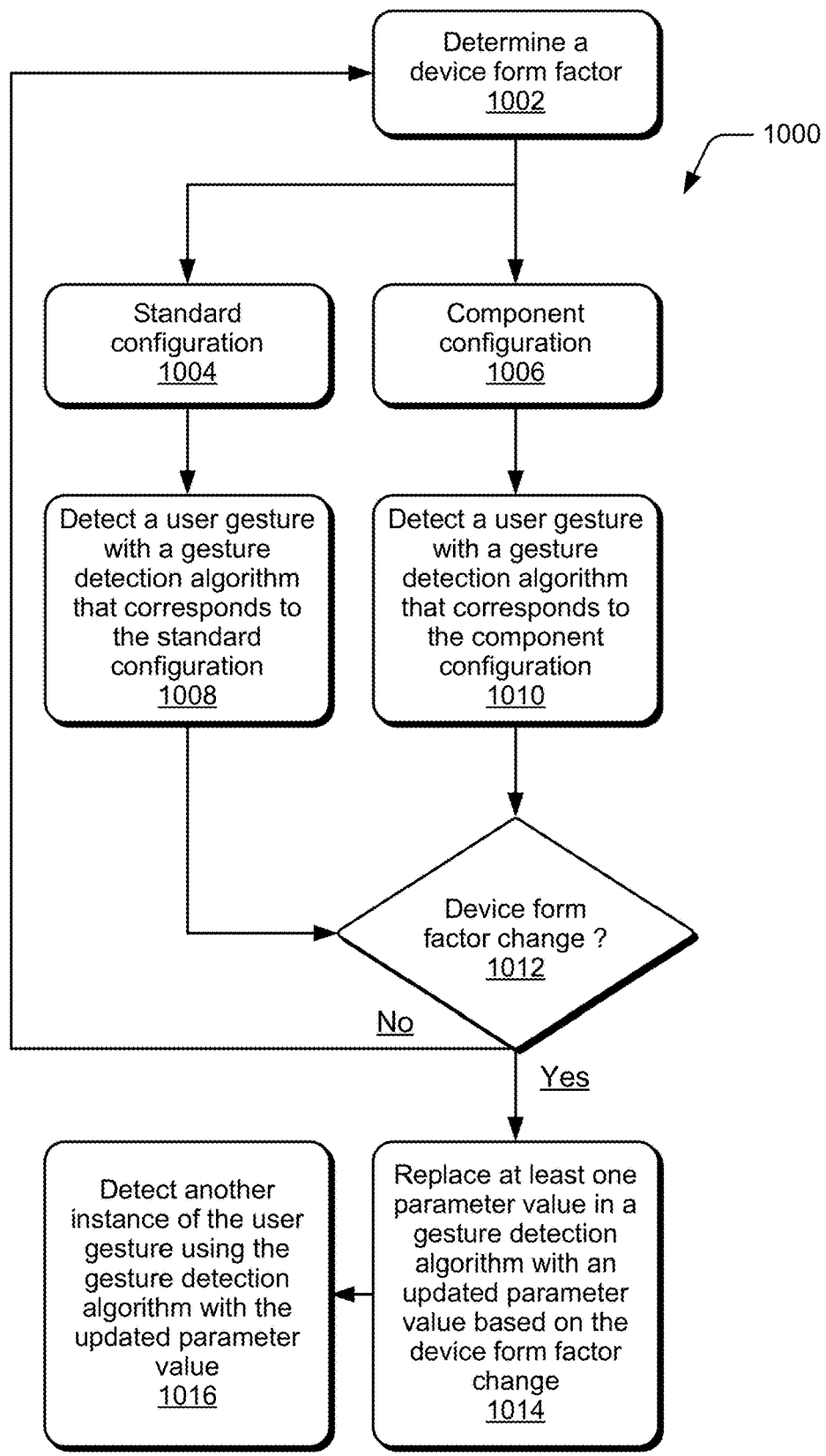
FIG. 10 illustrates an example method of the techniques for gesture detection based on device form factor as implemented by a mobile phone. Upon determining a change in the device form factor, such as a change from a standard configuration to an attached component configuration (or vice-versa), at least one parameter value in a gesture detection algorithm is replaced with a respective updated parameter value.

FIG. 10 illustrates example method(s) 1000 of gesture detection based on device form factor implemented by a mobile device. Upon determining a change in the device form factor, such as a change from a standard configuration to an attached component configuration (or vice-versa), at least one parameter value in a gesture detection algorithm is replaced with a respective updated parameter value. The order in which the method is described is not intended to be construed as a limitation, and any number or combination of the described method operations can be performed in any order to perform a method, or an alternate method.

At 1002, a form factor of a mobile phone is determined as one of a standard configuration of the mobile phone (at 1004) or a component configuration of the mobile phone (at 1006). For example, the gesture module 126 implemented by the mobile phone 110 determines the form factor 128 of the device as one of the standard configuration 116 of the device, or in the attached component configuration 114 with an additional component 112 attached to or integrated with the device.

At 1008, a user gesture is detected with a gesture detection algorithm that corresponds to the mobile phone in the standard configuration. Alternatively at 1010, a user gesture is detected with the gesture detection algorithm that corresponds to the mobile phone in the component configuration. For example, the gesture module 126 implemented by the mobile phone 110 detects a user gesture 138 utilizing the respective gesture detection algorithm 150 that corresponds to either the standard configuration 116 of the device, or in the component configuration 114 with an additional component 112 attached to or integrated with the device.

At 1012, a determination is made as to whether there has been a change in the device form factor. For example, the gesture module 126 determines whether the current form factor 128 of the mobile phone 110 has changed, such as a change from the standard configuration 116 to the component configuration 114 of the device, or a change from the component configuration 114 to the standard configuration 116 of the device. If there is no determined change in the device form factor (i.e., "No" from 1012), then the method continues at 1002 to determine the device form factor.

If there is a change in the device form factor of the mobile phone (i.e., "Yes" from 1012), then at 1014, at least one parameter value in the gesture detection algorithm is replaced with an updated parameter value based on the form factor change. For example, the gesture module 126 implemented by the mobile phone 110 replaces at least one parameter value in the gesture detection algorithm 150 that corresponds to the standard configuration 116 of the device with an updated parameter value, namely one that corresponds to the component configuration 116 of the device (or vice-versa). The parameter value 148 may be an updated acceleration value and/or an updated rotational motion value of the flip phone 104 to account for a change in the device mass 130, the center of gravity 132, and/or a moment of inertia 134 of the flip phone 104 corresponding to the change in device configuration. In implementations, the parameter values 148 can include, but are not limited to, an acceleration value of the mobile device, a rotational motion value of the mobile device, one or more threshold values, timeout durations, multiplicative factors, offsets, and/or any other type of gesture detection algorithm parameter values.

At 1016, the gesture detection algorithm with the updated parameter value is used to detect another instance of the user gesture. For example, the gesture module 126 utilizes the gesture detection algorithm 150 with the updated parameter value 148 to detect another instance of the gesture 138 performed by the user holding the mobile phone 110 in the changed form factor of the device, either a change from the standard configuration 116 to the component configuration 114 of the device, or a change from the component configuration 114 to the standard configuration 116 of the device.

Figure 11:
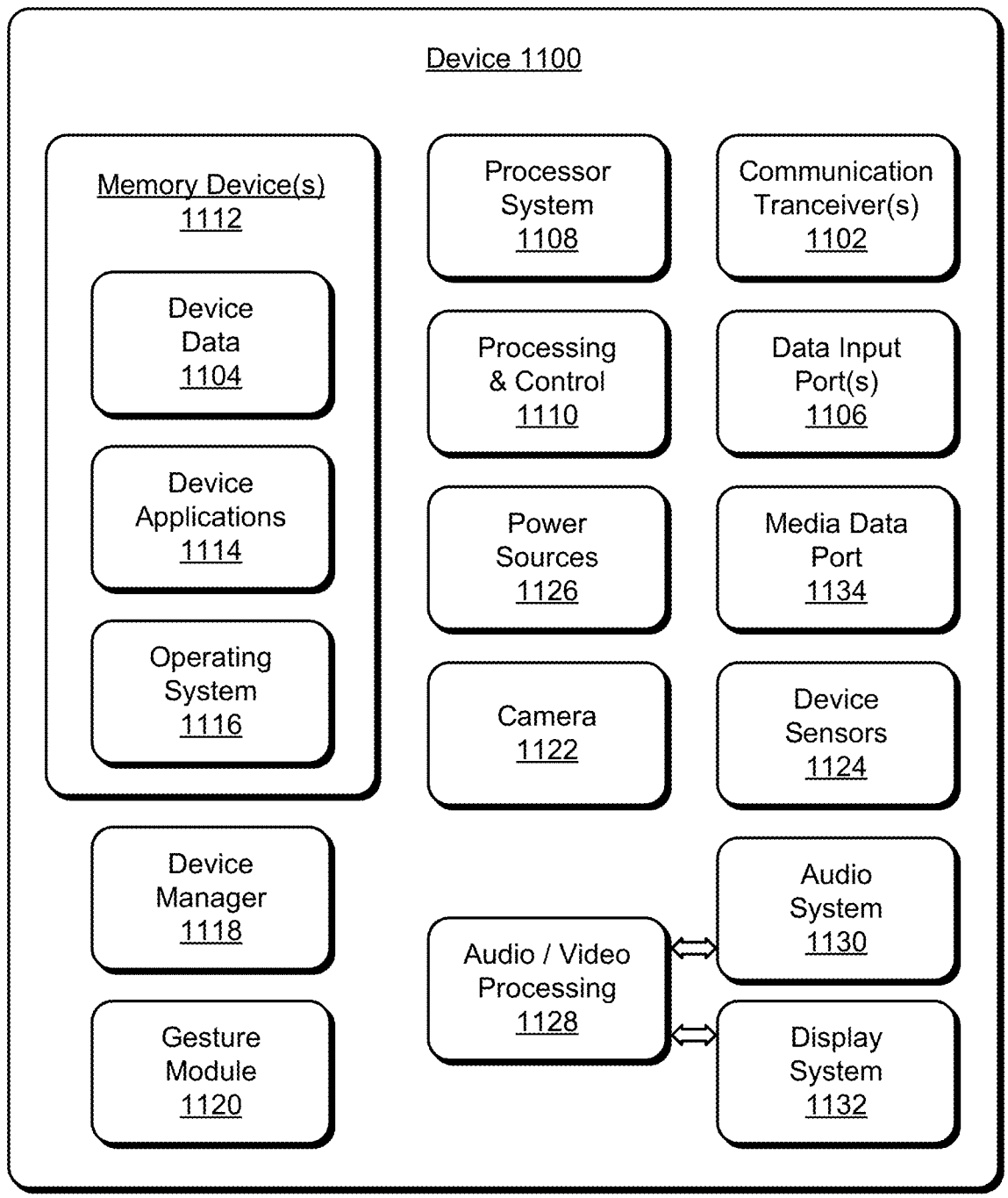
FIG. 11 illustrates various components of an example device that can used to implement the techniques of gesture detection based on device form factor.

FIG. 11 illustrates various components of an example device 1100, in which aspects of gesture detection based on device form factor can be implemented. The example device 1100 can be implemented as any of the devices described with reference to the previous FIGS. 1-10, such as any type of a device, mobile device, mobile phone, flip phone, client device, tablet, computing, communication, entertainment, gaming, media playback, and/or other type of electronic device. For example, the mobile device 102 described with reference to FIG. 1 may be implemented as the example device 1100.

The device 1100 includes communication transceivers 1102 that enable wired and/or wireless communication of device data 1104 with other devices. The device data 1104 can include any of the gesture module generated, stored, and/or determined data. Additionally, the device data 1104 can include any type of audio, video, and/or image data. Example communication transceivers 1102 include wireless personal area network (WPAN) radios compliant with various IEEE 802.15 (Bluetooth) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 1100 may also include one or more data input ports 1106 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1100 includes a processor system 1108 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1110. The device 1100 may further include any type of a system bus or other data and command transfer system that couples the various components within the device. A system bus can include any one or combination of different bus structures and architectures, as well as control and data lines.

The device 1100 also includes computer-readable storage memory 1112 (e.g., memory devices) that enable data storage, such as data storage devices that can be accessed by a computing device, and that provide persistent storage of data and executable instructions (e.g., software applications, programs, functions, and the like). Examples of the computer-readable storage memory 1112 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1100 may also include a mass storage media device.

The computer-readable storage memory 1112 provides data storage mechanisms to store the device data 1104, other types of information and/or data, and various device applications 1114 (e.g., software applications). For example, an operating system 1116 can be maintained as software instructions with a memory device and executed by the processor system 1108. The device applications may also include a device manager 1118, such as any form of a control application, software application, signal-processing and control module, code that is native to a particular device, a hardware abstraction layer for a particular device, and so on.

In this example, the device 1100 includes a gesture module 1120 that implements aspects of gesture detection based on device form factor. The gesture module 1120 may be implemented with hardware components, in firmware, and/or in software as one of the device applications 1114, such as when the device 1100 is implemented as the mobile device 102 described with reference to FIG. 1. An example of the gesture module 1120 includes the gesture module 126 that is implemented by the mobile device 102, such as a software application and/or as hardware components in the mobile device. In implementations, the gesture module 1120 may include independent processing, memory, and logic components as a computing and/or electronic device integrated with the example device 1100.

In this example, the device 1100 also includes a camera 1122 and device sensors 1124, such as may be implemented as components of an inertial measurement unit (IMU) (e.g., an inertial measurement unit implemented as the device sensors 124 in the mobile device 102). The device sensors 1124 can be implemented with various sensors, such as a gyroscope, an accelerometer, and/or other types of motion sensors to sense motion of the device. The device sensors 1124 can generate sensor data vectors having three-dimensional parameters (e.g., rotational vectors in x, y, and z-axis coordinates) indicating location, position, acceleration, rotational speed, and/or orientation of the device. The device 1100 can also include one or more power sources 1126, such as when the device is implemented as a mobile device or collaborative device. The power sources may include a charging and/or power system, and can be implemented as a flexible strip battery, a rechargeable battery, a charged super-capacitor, and/or any other type of active or passive power source.

The device 1100 can also include an audio and/or video processing system 1128 that generates audio data for an audio system 1130 and/or generates display data for a display system 1132. The audio system and/or the display system may include any devices that process, display, and/or otherwise render audio, video, display, and/or image data.

Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1134. In implementations, the audio system and/or the display system are integrated components of the example device. Alternatively, the audio system and/or the display system are external, peripheral components to the example device.

Although implementations of gesture detection based on device form factor have been described in language specific to features and/or methods, the subject of the appended claims is not necessarily limited to the specific features or methods described. Rather, the specific features and methods are disclosed as example implementations of gesture detection based on device form factor, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A mobile device, comprising: a memory to maintain gesture detection algorithms from which gestures are detectable based on device configurations of the mobile device; a gesture module implemented at least partially in computer hardware to: determine a form factor of the mobile device as one of the device configurations; select a gesture detection algorithm from the gesture detection algorithms that corresponds to the form factor of the mobile device; and utilize the gesture detection algorithm to detect a gesture performed by a user holding the mobile device in the form factor of the mobile device.

Alternatively or in addition to the above described mobile device, any one or combination of: the gesture module is implemented to determine a change in the form factor of the mobile device; identify a different gesture detection algorithm that corresponds to the change in the form factor of the mobile device; and replace the gesture detection algorithm with the different gesture detection algorithm. The gesture module is implemented to utilize the different gesture detection algorithm to detect another instance of the gesture performed by the user holding the mobile device in the changed form factor of the mobile device. The mobile device is a flip phone having a flip-open configuration and a flip-closed configuration. The gesture module is implemented to determine the change in the form factor of the mobile device as one of the flip-open configuration changed to the flip-closed configuration, or the flip-closed configuration changed to the flip-open configuration. The gesture module is implemented to determine a change in the form factor of the mobile device as an additional component having been attached to the mobile device. The gesture module is implemented to receive one or more parameters from the additional component, the one or more parameters indicating at least one of a mass of the additional component and a center of gravity of the additional component. The gesture module is configured to differentiate between the gesture by linking each of the gestures with respective gesture detection algorithms, and correlating each of the gesture detection algorithms with respective form factors of the mobile device.

A method, comprising: determining a form factor of a mobile device as one of multiple device configurations of the mobile device; selecting a gesture detection algorithm that corresponds to the form factor of the mobile device, the gesture detection algorithm usable to detect a gesture performed by a user holding the mobile device in the form factor of the mobile device; determining a change in the form factor of the mobile device; and replacing, based on the change in the form factor, the gesture detection algorithm with a different gesture detection algorithm that is usable to detect the gesture performed by the user holding the mobile device in the changed form factor of the mobile device.

Alternatively or in addition to the above described method, any one or combination of: utilizing the gesture detection algorithm to detect the gesture performed by the user holding the mobile device in the form factor of the mobile device, and utilizing the different gesture detection algorithm to detect another instance of the gesture performed by the user holding the mobile device in the changed form factor of the mobile device. The replacing the gesture detection algorithm includes changing one or more sensor input selections to a gesture module of the mobile device. The mobile device is a flip phone having a flip-open configuration and a flip-closed configuration; the determining the form factor of a mobile phone includes determining one of the flip-open configuration or the flip-closed configuration of the flip phone; and the determining the change in the form factor of the mobile device includes determining the change as one of the flip-open configuration changed to the flip-closed configuration, or the flip-closed configuration changed to the flip-open configuration. The determining the change in the form factor of a mobile device includes determining an additional component having been attached to the mobile device. The method further comprising receiving, from the additional component, one or more parameters indicating at least one of a mass of the additional component and a center of gravity of the additional component. The method further comprising differentiating between different gestures by linking each of the different gestures with respective gesture detection algorithms; correlating each of the respective gesture detection algorithms with respective form factors of the mobile device; and initiating a device application based on the detected gesture. The method further comprising selecting the device application based on the determining the form factor of the mobile device as one of the multiple device configurations, and wherein the selected device application is initiated based on detecting the gesture.

A method, comprising: determining a form factor of a mobile device as one of multiple device configurations of the mobile device; utilizing a gesture detection algorithm to detect a gesture performed by a user holding the mobile device in the form factor of the mobile device; determining a change in the form factor of the mobile device; and replacing one or more parameter values in the gesture detection algorithm with respective updated parameter values that correspond to the change in the form factor of the mobile device.

Alternatively or in addition to the above described method, any one or combination of: the one or more parameter values include threshold values corresponding to an acceleration value of the mobile device based on the gesture performed by the user, and a rotational motion value of the mobile device based on the gesture performed by the user. The mobile device is a flip phone having a flip-open configuration and a flip-closed configuration, and the change in the form factor of the mobile device is one of the change from the flip-open configuration changed to the flip-closed configuration, or the flip-closed configuration changed to the flip-open configuration. The change in the form factor of the mobile device includes an additional component attached to the mobile device, the additional component providing the respective updated parameter values to the mobile device based on the change in the form factor of the mobile device.

The invention claimed is:

1. A mobile device, comprising:
a memory to maintain gesture detection algorithms from which gestures are detectable based on device configurations of the mobile device;
a gesture module implemented at least partially in computer hardware to:
determine a form factor of the mobile device as one of the device configurations that physically change the form factor of the mobile device;
select a gesture detection algorithm from the gesture detection algorithms that corresponds to the form factor of the mobile device; and
utilize the gesture detection algorithm to detect a gesture performed by a user holding the mobile device in the form factor of the mobile device.

2. The mobile device as recited in claim 1, wherein the gesture module is implemented to:
determine a physical change in the form factor of the mobile device;
identify a different gesture detection algorithm that corresponds to the physical change in the form factor of the mobile device; and
replace the gesture detection algorithm with the different gesture detection algorithm.

3. The mobile device as recited in claim 2, wherein the gesture module is implemented to utilize the different gesture detection algorithm to detect another instance of the gesture performed by the user holding the mobile device in the changed form factor of the mobile device.

4. The mobile device as recited in claim 2, wherein the mobile device is a flip phone having a flip-open configuration and a flip-closed configuration.

5. The mobile device as recited in claim 4, wherein the gesture module is implemented to determine the physical change in the form factor of the mobile device as one of the flip-open configuration changed to the flip-closed configuration, or the flip-closed configuration changed to the flip-open configuration.

6. The mobile device as recited in claim 1, wherein the gesture module is implemented to determine a physical change in the form factor of the mobile device as an additional component having been attached to the mobile device.

7. The mobile device as recited in claim 6, wherein the gesture module is implemented to receive one or more parameters from the additional component, the one or more parameters indicating at least one of a mass of the additional component and a center of gravity of the additional component.

8. The mobile device as recited in claim 1, wherein gesture module is configured to differentiate between the gestures by:
linking each of the gestures with respective gesture detection algorithms; and
correlating each of the gesture detection algorithms with respective form factors of the mobile device.

9. A method, comprising:
determining a form factor of a mobile device as one of multiple device configurations that physically change the form factor of the mobile device;
selecting a gesture detection algorithm that corresponds to the form factor of the mobile device, the gesture detection algorithm usable to detect a gesture performed by a user holding the mobile device in the form factor of the mobile device;
determining a physical change in the form factor of the mobile device; and
replacing, based on the physical change in the form factor, the gesture detection algorithm with a different gesture detection algorithm that is usable to detect the gesture performed by the user holding the mobile device in the changed form factor of the mobile device.

10. The method as recited in claim 9, further comprising:
utilizing the gesture detection algorithm to detect the gesture performed by the user holding the mobile device in the form factor of the mobile device; and
utilizing the different gesture detection algorithm to detect another instance of the gesture performed by the user holding the mobile device in the changed form factor of the mobile device.

11. The method as recited in claim 9, wherein the replacing the gesture detection algorithm includes changing one or more sensor input selections to a gesture module of the mobile device.

12. The method as recited in claim 9, wherein:
the mobile device is a flip phone having a flip-open configuration and a flip-closed configuration;
the determining the form factor of a mobile device includes determining one of the flip-open configuration or the flip-closed configuration of the flip phone; and
the determining the physical change in the form factor of the mobile device includes determining the physical change as one of the flip-open configuration changed to the flip-closed configuration, or the flip-closed configuration changed to the flip-open configuration.

13. The method as recited in claim 9, wherein the determining the physical change in the form factor of the mobile device includes determining an additional component having been attached to the mobile device.

14. The method as recited in claim 13, further comprising:
receiving, from the additional component, one or more parameters indicating at least one of a mass of the additional component and a center of gravity of the additional component.

15. The method as recited in claim 9, further comprising:
differentiating between different gestures by:
linking each of the different gestures with respective gesture detection algorithms;
correlating each of the respective gesture detection algorithms with respective form factors of the mobile device; and
initiating a device application based on the detected gesture.

16. The method as recited in claim 15, further comprising:
selecting the device application based on the determining the form factor of the mobile device as one of the multiple device configurations, and wherein the selected device application is initiated based on detecting the gesture.

17. A method, comprising:
determining a form factor of a mobile device as one of multiple device configurations that physically change the form factor of the mobile device;
utilizing a gesture detection algorithm to detect a gesture performed by a user holding the mobile device in the form factor of the mobile device;

determining a physical change in the form factor of the mobile device; and replacing one or more parameter values in the gesture detection algorithm with respective updated parameter values that correspond to the physical change in the form factor of the mobile device.

18. The method as recited in claim 17, wherein the one or more parameter values include threshold values corresponding to an acceleration value of the mobile device based on the gesture performed by the user, and a rotational motion value of the mobile device based on the gesture performed by the user.

19. The method as recited in claim 17, wherein:

the mobile device is a flip phone having a flip-open configuration and a flip-closed configuration; and the physical change in the form factor of the mobile device is one of the physical change from the flip-open configuration changed to the flip-closed configuration, or the flip-closed configuration changed to the flip-open configuration.

20. The method as recited in claim 17, wherein:

the physical change in the form factor of the mobile device includes an additional component attached to the mobile device, the additional component providing the respective updated parameter values to the mobile device based on the physical change in the form factor of the mobile device.

* * * * *